US012769737B2

(12) United States Patent
Shi et al.

(10) Patent No.: US 12,769,737 B2
(45) Date of Patent: Oct. 20, 2026

(54) METHODS, SYSTEMS, ELECTRONIC DEVICES, AND STORAGE MEDIUMS FOR QUERYING SHARDED NoSQL DATA

(71) Applicant: ZHEJIANG DAHUA TECHNOLOGY CO., LTD., Hangzhou (CN)

(72) Inventors: Huihua Shi, Hangzhou (CN); Linhao Zhu, Hangzhou (CN); Mingwei Zhou, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 19/078,315

(22) Filed: Mar. 13, 2025

(65) Prior Publication Data

US 2025/0209073 A1 Jun. 26, 2025

Related U.S. Application Data

(63) Continuation of application No. PCT/CN2023/116709, filed on Sep. 4, 2023.

(30) Foreign Application Priority Data

Sep. 13, 2022 (CN) .......................... 202211112104.2

(51) Int. Cl.
*G06F 16/2453* (2019.01)
*G06F 16/22* (2019.01)

(52) U.S. Cl.
CPC .... *G06F 16/24542* (2019.01); *G06F 16/2282* (2019.01)

(58) Field of Classification Search
CPC .......... G06F 16/24542; G06F 16/2282; G06F 16/3334; G06F 16/2425; G06F 16/2228
See application file for complete search history.

(56) References Cited

U.S. PATENT DOCUMENTS

| | | | | |
|---|---|---|---|---|
| 11,308,058 B1 * | 4/2022 | Jiang | G06F 16/2264 | |
| 11,650,981 B1 * | 5/2023 | Kondamudi | G06F 11/3419 | 707/713 |

(Continued)

FOREIGN PATENT DOCUMENTS

| | | |
|---|---|---|
| CN | 1858737 A | 11/2006 |
| CN | 110457363 A | 11/2019 |

(Continued)

OTHER PUBLICATIONS

International Search Report in PCT/CN2023/116709 mailed on Nov. 13, 2023, 4 pages.

(Continued)

*Primary Examiner* — Dangelino N Gortayo
(74) *Attorney, Agent, or Firm* — METIS IP LLC

(57) ABSTRACT

Methods and systems for querying sharded NoSQL data are provided. The method may include obtaining an index setting and an associated field; determining routing values based on the associated field; establishing an index group including a plurality of indexes, at least a portion of the plurality of indexes having the associated field; dividing each of the plurality of indexes into a plurality of shards based on the index setting and the routing values; obtaining an association query request based on the associated field; and in response to receiving the association query request, determining a query result based on the plurality of shards.

18 Claims, 13 Drawing Sheets

(56) References Cited

U.S. PATENT DOCUMENTS

| | | | | |
|---|---|---|---|---|
| 2009/0299991 | A1 | 12/2009 | Zarzar Charur et al. | |
| 2016/0378612 | A1* | 12/2016 | Hipsh | G06F 11/1451 707/647 |
| 2018/0039671 | A1 | 2/2018 | Yang et al. | |
| 2020/0401638 | A1 | 12/2020 | Galimovich | |
| 2021/0117425 | A1* | 4/2021 | Rao | H04L 41/0806 |
| 2022/0207043 | A1* | 6/2022 | Dar | G06F 16/9024 |
| 2022/0292120 | A1* | 9/2022 | Jiang | G06F 16/215 |

FOREIGN PATENT DOCUMENTS

| | | | |
|---|---|---|---|
| CN | 110750555 | A | 2/2020 |
| CN | 112231400 | A | 1/2021 |
| CN | 112463827 | A | 3/2021 |
| CN | 112989171 | A | 6/2021 |
| CN | 114547352 | A | 5/2022 |
| WO | 2022006794 | A1 | 1/2022 |
| WO | 2023138505 | A1 | 7/2023 |
| WO | 2024055856 | A1 | 3/2024 |

OTHER PUBLICATIONS

Written Opinion in PCT/CN2023/116709 mailed on Nov. 13, 2023, 5 pages.

Wang, Zhanying et al., Research and Implementation of Distributed General Query System Based on Metadata, Microcomputer Applications, 33(8): 46-50, 2017.

"MySQL: Index addition for multi-table join query", Web page <https://blog.csdn.net/weixin_43608796/article/details/119645376>, Aug. 12, 2021.

First Office Action in Chinese Application No. 202211112104.2 mailed on Jul. 28, 2025, 11 pages.

* cited by examiner

METHODS, SYSTEMS, ELECTRONIC DEVICES, AND STORAGE MEDIUMS FOR QUERYING SHARDED NoSQL DATA

CROSS-REFERENCE TO RELATED APPLICATIONS

This application is a continuation of International Application No. PCT/CN2023/116709, filed on Sep. 4, 2023, which claims priority of Chinese Patent Application No. 202211112104.2, filed on Sep. 13, 2022, the contents of each of which are entirely incorporated herein by reference.

TECHNICAL FIELD

The present disclosure relates to the field of data query, and in particular, to methods and systems for querying sharded NoSQL data.

BACKGROUND

A Non-relational SQL (NoSQL) database has very high read and write performance, especially in a large data volume. The NoSQL database has a non-relational nature and a simple structure, which may perform high-performance processing on big data.

Elasticsearch (ES) is a very popular search query engine for near real-time processing, which may be used for a query in the NoSQL database. Elasticsearch (ES) may build an index for a specific field in a document during the query, so that a document may be found quickly based on a specific field-oriented condition. However, during the ES query, if an associated field is between two indexes, a user may not directly perform an association query operation between the two indexes using ES, but the application may need to perform an associated operation on queried results, so the query processing not only has low performance, but also the difficulty of application development is increased.

Therefore, it is desirable to provide methods and systems for querying sharded NoSQL data to perform the association query operation in shard-level parallelism to improve the association query performance.

SUMMARY

One or more embodiments of the present disclosure provide a method for querying sharded NoSQL data. The method may include obtaining an index setting and an associated field and determining routing values based on the associated field. The method may also include establishing an index group including a plurality of indexes, at least a portion of the plurality of indexes having the associated field and dividing each of the plurality of indexes into a plurality of shards based on the index setting and the routing values. The method may further include obtaining an association query request based on the associated field and in response to receiving the association query request, determining a query result based on the plurality of shards.

One or more embodiments of the present disclosure provide a system for querying sharded NoSQL data. The system may include: a first obtaining module configured to obtain an index setting and an associated field. The system may include a first determination module configured to determine routing values based on the associated field. The system may include a second determination module configured to establish an index group including a plurality of indexes, at least a portion of the plurality of indexes having the associated field and dividing each of the plurality of indexes into a plurality of shards based on the index setting and the routing values. The system may include a second obtaining module configured to obtain an association query request based on the associated field. The system may include a third determination module configured to in response to receiving the association query request, determine a query result based on the plurality of shards.

One or more embodiments of the present disclosure provide an electronic device including a storage and a processor. The processor may be configured to execute program instructions stored in the storage to implement the method for querying sharded NoSQL data.

One or more embodiments of the present disclosure provide a computer-readable storage medium storing computer instructions. When reading the computer instructions in the storage medium, a computer may perform the method for querying sharded NoSQL data.

The methods, systems, electronic devices, and storage mediums for querying sharded NoSQL data described in some embodiments of the present disclosure can achieve at least the following effects: (1) an association query function between two indexes may be realized, and the association operation between the two indexes may be performed directly in the association query without a need for an application to complete the implementation of the association operation, which can greatly reduce the complexity of the application implementation; (2) an associated field may be used as routing values of the two indexes, so that association data may be distributed in shards with shard serial numbers corresponding to the two indexes, and the data association operation may not be performed across the shards, but the association operation only needs to be performed between the shards with the shard serial numbers corresponding to the two indexes, which can improve the correlation performance; (3) data in the index may be stored separately in a plurality of different shards, which can reduce the pressure of data query and storage; and (4) the correlation operation for shard-level concurrency may be provided, so that the associated operation may be completed concurrently between shards, and the different concurrency is independent of each other, which can greatly improve the performance of association query.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein.

DETAILED DESCRIPTION

Figure 1:
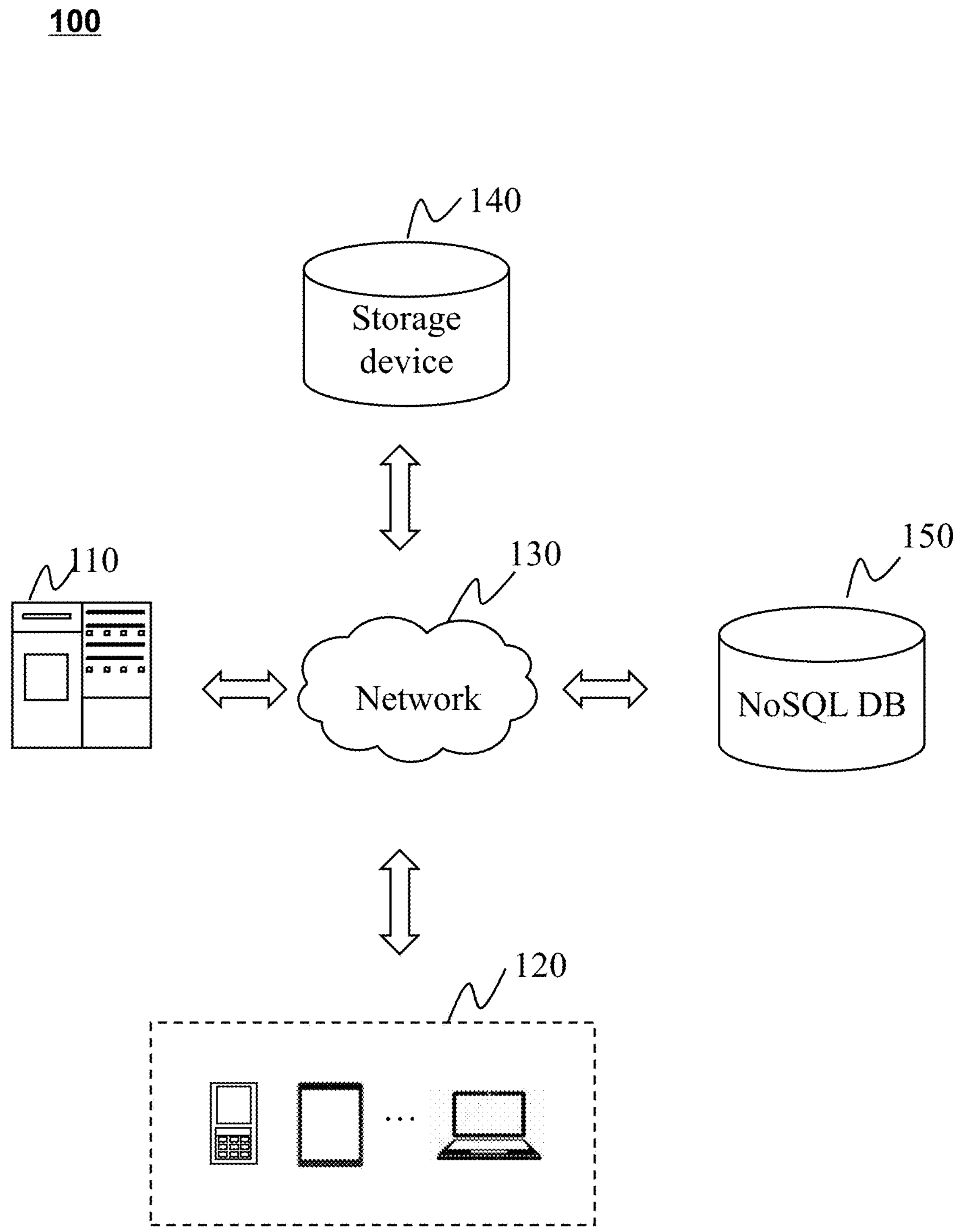
FIG. 1 is a schematic diagram illustrating an exemplary application scenario of a system for querying sharded NoSQL data according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the “system,” “device,” “unit,” and/or “module” used herein are one method to distinguish different components, elements, parts, sections, or assemblies of different levels. However, if other words can achieve the same purpose, the words can be replaced by other expressions.

As used in the disclosure and the appended claims, the singular forms “a,” “an,” and “the” include plural referents unless the content clearly dictates otherwise; the plural forms may be intended to include singular forms as well. In general, the terms “comprise,” “comprises,” and/or “comprising,” “include,” “includes,” and/or “including,” merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a schematic diagram illustrating an exemplary application scenario of a system for querying sharded NoSQL data according to some embodiments of the present disclosure.

As shown in FIG. 1, the system 100 (hereinafter referred to as the system 100) for querying sharded NoSQL data in the embodiments of the present disclosure may include a processor 110, a terminal 120, a network 130, a storage device 140, and a NoSQL DataBase (NoSQL DB) 150.

The processor 110 may process information and/or data related to the system 100 to perform one or more functions described in the present disclosure. For example, the processor 110 may receive a query request from the terminal 120 and perform a query in the NoSQL database 150 based on the query request.

In some embodiments, the processor 110 may include one or more processing engines (e.g., a single-chip processing engine or a multi-chip processing engine). Merely by way of example, the processor 110 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set computer (RISC), a microprocessor unit, or the like, or any combination thereof.

The terminal 120 may provide a functional component related to user interaction and capable of realizing a user interaction function (e.g., providing or displaying information and data to the user). The user refers to a person who needs to perform a data query, etc. Merely by way of example, the terminal 120 may include a mobile device, a tablet computer, a laptop computer, a desktop computer, or other devices having input and/or output functions, or the like, or any combination thereof. Merely by way of example, the output function may include, but are not limited to, a function such as a sound output such as voice, a screen display, a somatosensory transmission such as vibration, an output of an electromagnetic wave signal such as light, or the like, or any combination thereof. Merely by way of example, the input function may include, but is not limited to, a function such as a keyboard input, a touch screen input, a voice input, an input of a motion event such as tilting/shaking/rotating/swinging of a device, an input of an electromagnetic wave signal such as light, or the like, or any combination thereof.

In some embodiments, the user may input information and/or data via the terminal 120 and/or obtain the information and/or data via the terminal 120. For example, the user may input the query request via the terminal 120. As another example, the user may obtain the query result, etc., via the terminal 120.

The network 130 may include any suitable network that facilitates exchange of the information and/or data of the system 100. In some embodiments, one or more components of the system 100 (e.g., the processor 110, the terminal device 120, the storage device 140) may communicate the information and/or data with one or more other components of the system 100 via the network 130. In some embodiments, the network 130 may be and/or include a public network, a private network, a wide area network (WAN), a wired network, a wireless network, a cellular network, a frame relay network, a virtual private network, a satellite network, a telephone network, routers, hubs, switches, or the like, or any combination thereof. In some embodiments, the network 130 may include one or more network access points. For example, the network 130 may include wired and/or wireless network access points such as base stations and/or Internet exchange points, through which one or more components of the system 100 may be connected to the network 130 to exchange the data and/or information.

The storage device 140 may store data, instructions, and/or any other information. In some embodiments, the storage device 140 may store data obtained from the terminal 120 and/or the processor 110. For example, the storage device 140 may store the query request, etc. input by the user. As another example, the storage device 140 may also store data, etc. in the NoSQL database 150. In some embodiments, the storage device 140 may include a mass storage, a removable storage, a volatile read-write memory, a read-only memory (ROM), or the like, or any combination thereof. In some embodiments, the storage device 140 may be executed on a cloud platform. In some embodiments, the storage device 140 may be connected to the network 130 to communicate with one or more other components of the system 100 (e.g., the processor 110, the terminal 120). In some embodiments, the storage device 140 may be part of the processor 110.

The NoSQL database 150 may be a non-relational database. The data in the NoSQL Database 150 may be non-relational to each other. The NoSQL database 150 may have a high read and write performance and may be extremely efficient during the processing of a large number of data. When the user needs to perform the query on a large number of data, the NoSQL Database 150 may be used. Merely by way of example, the NoSQL database 150 may include a key-value storage database, a column storage database, a document-based database, or the like.

For the purpose of illustration, the NoSQL database 150 being the document database may be taken as an example below. The data in the NoSQL database 150 may be stored as a plurality of documents. Each document may correspond to an index. The user may perform an association query in the plurality of documents based on the index. More descriptions regarding performing the association query based on the indexes may be found elsewhere in the present disclosure, e.g., FIG. 2 and the descriptions thereof.

It should be noted that the above descriptions is merely provided for the purpose of illustration, and not intended to limit the scope of the present disclosure. For those skilled in the art, multiple variations and modifications may be made under the guidance of the present disclosure. Features, structures, methods, and other features of the exemplary embodiments described herein may be combined in various ways to obtain additional and/or alternative exemplary embodiments. However, these variations and modifications do not depart from the scope of the present disclosure.

Figure 2:
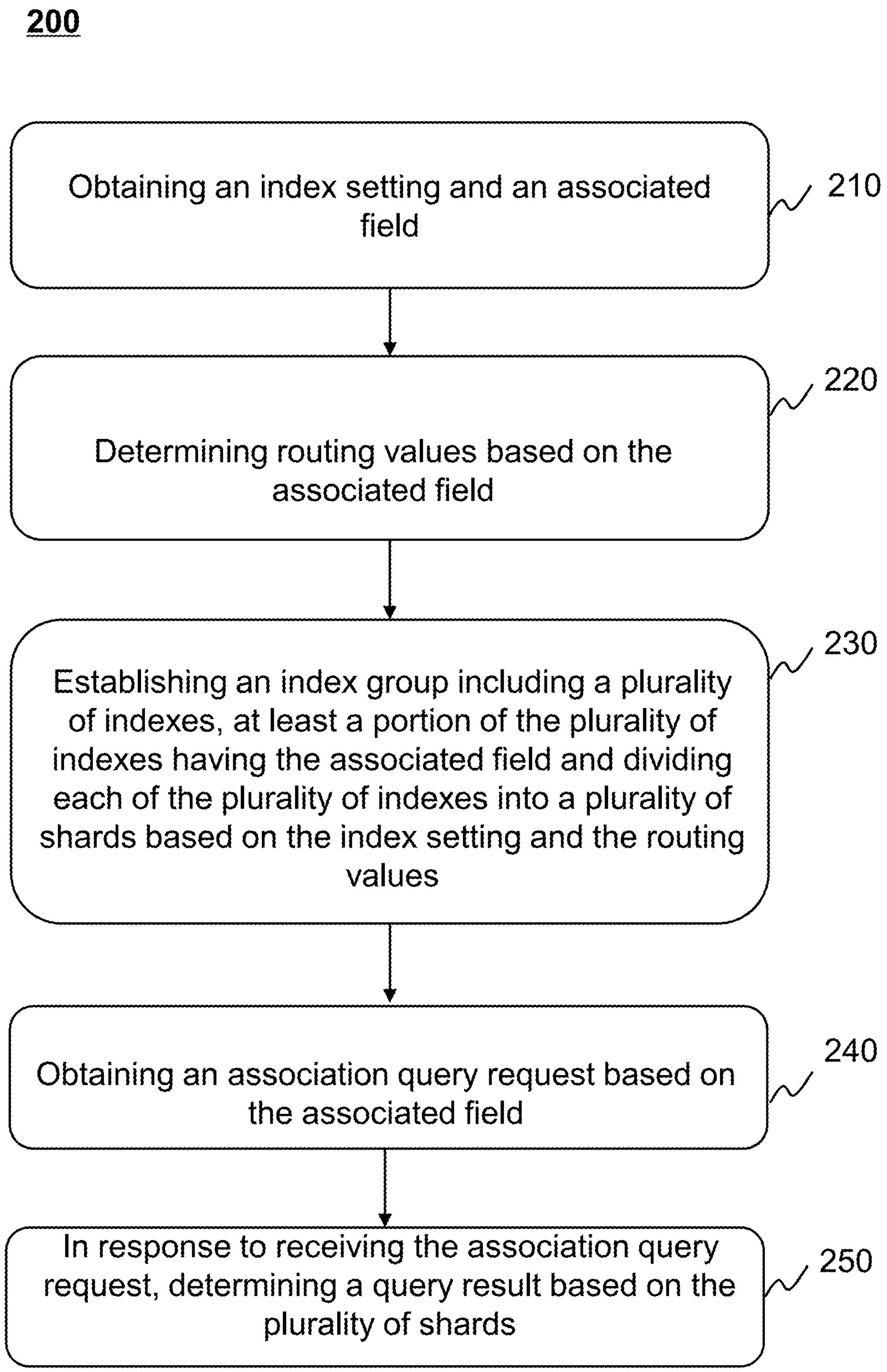
FIG. 2 is a flowchart illustrating an exemplary process for querying sharded NoSQL data according to some embodiments of the present disclosure.

FIG. 2 is a flowchart illustrating an exemplary process for querying sharded NoSQL data according to some embodiments of the present disclosure. In some embodiments, process 200 may be executed by the processor 110.

In some embodiments, process 200 for querying sharded NoSQL data may be performed by a search engine, such as a distributed search engine (Elasticsearch), or other search engines, which are not limited herein. It is understood that when the search engine described in the present disclosure is used as the execution body, an actual hardware execution entity may be one or more node devices (e.g., processor 110) involved in the operation of the search engine.

As shown in FIG. 2, process 200 may include the following operations.

In 210, an index setting and an associated field may be obtained.

When a data query task is performed, an amount of data may be relatively large, and in order to reduce the amount of data for query and improve a query speed, the query task may be performed based on indexes.

An index refers to a pointer pointing to a data value stored in a database when a query task is performed. In the case of a document NoSQL database, the index refers to a pointer pointing to the data of each document in the document NoSQL database. In some embodiments, an index may be determined based on the index setting. Index settings of a plurality of indexes that have an association relationship may have an association relationship.

The index setting refers to a setting used to build an index. In some embodiments, the index setting may include data that the user needs to query. In some embodiments, the index setting may include the associated field.

In some embodiments, the index setting may include data that the user needs to query and the associated field.

The index setting may be determined based on a user input. For example, the index setting may be determined based on a query condition input by the user, etc.

Taking a query task including querying a document identifier (docID) "an English name includes John and a score is greater than 90" as an example, the processor may determine different index settings for different documents in storage data. For example, if a document 1 includes a large number of student names and scores and a docID (first docID) corresponding to the document 1, and a document 2 includes a large number of student names and English names and a docID (second docID) corresponding to the document 2, both the document 1 and the document 2 include the student names. A student name is an associated field of the document 1 and the document 2. A first index setting corresponding to the document 1 may include the first docID, a student name, a score, etc. A second index setting corresponding to the document 2 may include the second docID, a student name, an English name, etc. The processor may need to build a first pointer pointing to the first docID, the student name, and the score based on the first index setting when building an index (i.e., index 1) corresponding to the document 1. The processor may need to build a second pointer pointing to the second docID, the student name, and the English name based on the second index setting when building an index (i.e., index 2) corresponding to the document 2. That is, the index 1 may include the first pointer pointing to the first docID, the student name, and the score. The index 2 may include the second pointer pointing to the second docID, the student name, and the English name.

There may be a plurality of docIDs in both the document 1 and the document 2. For example, one piece of data may correspond to one docID (e.g., one student name may correspond to one docID, etc.).

In some embodiments, the indexes may be divided into different shards, and more descriptions regarding dividing the indexes into different shards may be found elsewhere in the present disclosure, e.g., operation 230.

The associated field refers to a field (including a string, a number, etc., or a combination thereof) that is used to associate different indexes. For example, the associated field may be a same field name between the different indexes. In other words, the associated field between the different indexes may include the same field in the different indexes. Continuing to refer to the previous example, the associated field for index 1 and index 2 may be the student name. The association field may be determined based on the index setting. For example, the processor may determine a same index setting between a plurality of index settings as the associated field. For example, if the index settings corresponding to the index 1 and the index 2 both include a student name, the student name may be determined as the associated field.

In some embodiments, if there is a plurality of indexes (e.g., at least 3 indexes) and the association query is performed on the plurality of indexes, each of the plurality of indexes may need to have an associated field with the other indexes. In other words, the plurality of indexes may have an association relationship. For example, for the association query between 3 indexes, if each of an index 1, an index 2, and an index 3 have an associated field with the other indexes, the association query may be performed. If at least one of the 3 indexes does not have an associated field with the other indexes, the association query may not be performed on the 3 indexes.

In 220, routing values may be determined based on the associated field.

The routing value may be a parameter value used to determine a shard. That is, the processor may divide data corresponding to an index in the database into a corresponding shard based on the routing value. More descriptions regarding the shard may be found elsewhere in the present disclosure, e.g., operation 230.

The routing values may be determined based on the associated field. For example, the processor may determine the associated field value or the associated field as the routing values. Continuing to refer to the previous example of querying the student score, if the associated field between the index 1 and the index 2 is the student name, the routing values of the index 1 and the routing values of the index 2 may be the student name.

The plurality of indexes may form an index group. In some embodiments, the associated field may have a plurality of associated field values, and one associated field value may correspond to one routing value. For example, if the associated field of the index 1 and the index 2 is the student name, and the associated field includes a plurality of student names, each student name of may be an association field value, and one student name may correspond to one routing value.

In some embodiments, the index group may include at least three indexes, and each of the indexes may have an associated field with any of the other indexes. The at least three indexes may use the same associated field. In other words, the at least three indexes in the index group may have an association relationship. The processor may determine the associated field value of the same associated field as the routing value.

In some embodiments, the plurality of indexes may include at least three indexes and at least two different associated fields (also referred to as second associated fields). One of the second associated fields may be same as or different from the associated field. In other words, at last a first portion of the at least three indexes in the index group may have a first association relationship and at last a second portion of the at least three indexes in the index group may have a second association relationship. The indexes in the first portion and the indexes in the second portion may have the same index or have no same index. For example, if the index group may include three indexes and at least two different associated fields (also referred to as second associated fields), the indexes in the first portion and the indexes in the second portion may have the same index. As another example, if the index group may include more than three indexes and at least two different associated fields (also referred to as second associated fields), the indexes in the first portion and the indexes in the second portion may have the same index or have no same index.

In some embodiments, the processor may splice the at least two associated fields based on a predetermined order to obtain a splicing result; perform a mapping on the splicing result to obtain a mapping result; and determine the routing values based on the mapping result.

Splicing the associated fields based on a predetermined order refers to combining the associated fields together in the predetermined order. An order of splicing may be a default setting of the system or set by a user. For example, the predetermined order may include connecting the first letter of an associated field with the last letter of another associated field. As another example, the predetermined order may include connecting the first letter of an associated field with the first letter of another associated field. As still another example, the predetermined order may include connecting the last letter of an associated field with the last letter of another associated field.

Performing a mapping on the splicing result may include performing a hash mapping, some other single mapping on the result of the splicing, etc.

The processor may designate the mapping result as the routing values.

In some embodiments of the present disclosure, when it is necessary to perform the association query on the plurality of indexes (e.g., 3 or more), the processor may obtain the routing values based on the plurality of associated fields by splicing and mapping the plurality of associated fields and shard the indexes based on the routing values, thereby dividing the data in the plurality of indexes that have association relationships into shards with a same shard number, facilitating the association query among the plurality of indexes, and improving the efficiency of the query. In addition, the result obtained by the splicing may be mapped, which may make forms of the obtained routing values more uniform and easier to read.

In 230, an index group including a plurality of indexes may be established. At least a portion of the plurality of indexes may have the associated field. Each of the plurality of indexes into a plurality of shards based on the index setting and the routing values.

The shards refer to a plurality of small parts that are easier to write and read obtained by dividing a large amount of data (i.e., data corresponding to each of the plurality of indexes in the NoSQL database). Data in the NoSQL database may be stored in a distributed manner, i.e., the storage data corresponding to each index may be stored in forms of the plurality of shards. Accordingly, each index corresponding to each storage data may also be divided into the plurality of shards and stored in the form of the corresponding shard.

A count of shards may be preset based on an actual situation (e.g., data volume). Each shard may correspond to a shard number. For example, if the index 1 is divided into 10 shards, the shard numbers corresponding to the index 1 may be 0, 1, 2, . . . , 9, respectively.

In some embodiments of the present disclosure, the data in the index may be stored separately in forms of different shards, which may reduce the pressure of data storage and query.

The index group may be a combination of the plurality of indexes. The index group on which the association query may be performed may include at least two indexes, and each index may have the associated field with at least one other index in the index group. In some embodiments, the processor may determine each index in the index group based on the index setting, and the relevant descriptions may be found in the present disclosure above, e.g., operation 210.

In some embodiments, the processor may divide each of the plurality of indexes in the index group into shards based on the routing values.

For example, the plurality of indexes may have multiple same routing values. The processor may divide each of the plurality of indexes into shards. Each of the shards of the index may correspond to one of the multiple same routing values and one shard number. The shards, corresponding to a same routing value, of at least two indexes may be assigned with the same shard number. A shard of an index that lacks a same routing value with other shards of other indexes may be assigned with a random shard number.

Taking an index P and an index Q as an example, the index P may include address information, the index Q may include name information, and the associated field between the two indexes may be a user ID (e.g., id 1~id 4, etc.). The index P may include 4 pieces of data, such as (id 1, address 1), (id 2, address 2), (id 3, address 1), and (id 4, address 2). The index Q may include 3 pieces of data such as (id 1, name 1), (id 2, name 2), and (id 3, name 3). The processor may set the user ID of the associated field between the index P and the index Q as the routing values, i.e., the routing values of the index P and the index Q may be id 1, id 2, and id 3, and the shard numbers corresponding to the routing values id 1, id 2, and id 3 may be 0, 1, and 2, respectively. The processor may randomly divide data that lacks routing values into a shard. For example, the data (id 4, address 2) in the index P may lack the associated field with the index Q, so the data (id 4, address 2) may also lack the routing values corresponding to the associated field, the processor may randomly divide the data (id 4, address 2) into a certain shard (e.g., a shard with a shard number of 0).

That is, the processor may divide the index P into 3 shards and divide the 4 pieces of data included in the index P into 3 shards based on the user IDs, for example, (id 1, address 1) may be divided into a shard with a shard number of 0, (id 2, address 2) may be divided into a shard with a shard number of 1, (id 3, address 1) may be divided into a shard with a shard number of 2, and (id 4, address 2) may be divided into a shard with a shard number of 0. Similarly, the index Q may be divided into 3 shards, and based on the user ID, the 3 pieces of data included in index Q may be divided into 3 shards, respectively, for example, (id 1, name 1), (id 2, name 2), and (id 3, name 3) may be divided into shards with the shard numbers of 0, 1, and 2, respectively. That is, the data in the indexes (e.g., index P and ex Q) with the same user ID may be divided into the shard with the same shard number. For example, (id 1, address 1) in index P and (id 1, name 1) in index Q may be both divided into the shard with the shard number of 0; (id 2, address 2) in index P and (id 2, name 2) in index Q may be both divided into the shard with the shard number of 1; (id 3, address 3) in index P and (id 3, name 3) in index Q may be both divided into the shard with the shard number of 3.

Similarly, when there are the plurality of indexes in the index group, the processor may divide each of the plurality of indexes into shards based on the determined routing values and store the data having an association relationship in the forms of the shards with the same shard number.

It should be noted that the shards of the different indexes merely have the same shard number, and the data is still stored in the forms of shards in each index.

Understandably, when the processor does not perform shard dividing based on the routing values, an index may be randomly assigned to different shards, which may cause difficulty in the subsequent association query.

In some embodiments of the present disclosure, the processor may divide the index into the shards based on the routing values, which may divide the data that has the association relationship into shards with the same shard number, thereby facilitating the subsequent association query and improving the query efficiency.

In 240, an association query request may be obtained based on the associated field.

The association query request may be a request for association query on data in a database.

In some embodiments, the association query request may include the associated field, a query condition based on the index group, a query order of an index within the index group, or the like, or a combination thereof.

The query condition may be a condition for querying in the index. The query condition may be used to constrain a query content. The query condition may include an initial condition and a current query condition.

The initial query condition refers to a condition input by the user for querying the data in the index. Taking the query task input by the user that incudes querying a docID including an English name "John" and a score greater than 90 as an example, the initial query condition corresponding to the index 1 may include querying for a student whose score is greater than 90, the initial query condition corresponding to the index 2 may include querying for a student whose English name is John.

The current query condition refers to a condition under which the current index is queried. Current query conditions corresponding to different indexes may be different. For example, a current query condition of a first index may be the initial query condition of the index. A query condition of a non-first index may be determined based on the initial query condition of the non-first index and a query result of a previous index of the non-first index.

The first index refers to an index that is first in the query order. The non-first index refers to each of the other indexes that are queried after the first index.

Following the previous example, if the processor first query index 1 and query then index 2, the index 1 may be the first index, and the index 2 may be the non-first index. The current query condition of index 1 may be the initial query condition of index 1, i.e., querying for a docID corresponding to the student name with a score greater than 90. The current query condition of index 2 may include querying to obtain the docID of the English name corresponding to the student name obtained in index 1.

The query order refers to an order in which the plurality of indexes in the index group are queried.

In some embodiments, the processor may determine the query order based on a default order. For example, the query order may be to query index 1 before index 2, etc.

In some embodiments, the query order may be determined based on a satisfaction degree of the query condition and a query type.

The satisfaction degree of the query condition refers to an indicator that represents a volume of data in an index that satisfies the query condition. The satisfaction degree of the query condition may be obtained based on a statistics table of field popularities (also referred to as a field popularity statistics table). The query condition may be the initial query condition.

The field popularity statistics table may include fields of the plurality of indexes in the index group and a query popularity corresponding to each field. Taking the index P and the index Q as an example, the field popularity statistics table may include the fields in the index P and the index Q and the query popularity corresponding to each field, e.g., a field of address 1 and the query popularity corresponding to the field of address 1, a field of name 1 and the query popularity corresponding to the field of name 1, etc. The field may be an individual data record in the index, such as address 1, address 2, name 1, name 2, etc.

The query popularity refers to a popularity of a field being queried within a preset period of time. The query popularity of a field may represent a frequency or times of the field being queried within a preset period of time. The greater the query popularity of a field is, the larger frequency or times of the field being queried may be. The query popularity may be determined based on historical query tasks and historical query results within the preset period of time (e.g., last 7 days, last 30 days). For example, the query popularity of address 1 in index P may be determined based on a count of times the user has queried for address 1 in the last 7 days. The query popularity may be determined in various ways. For example, the processor may determine the count of times the user has queried directly as the query popularity, or may determine the weighted counts of queries as the query popularity.

In some embodiments, the field popularity statistic table may be updated periodically. It will be understood that to reduce data pressure and save resources, the frequency of updating the field popularity statistics table may be positively correlated with the frequency of query requests from the user. That is, the more frequent the user queries, the faster the field popularity statistics table may be updated.

In some embodiments, the satisfaction degree of the query condition may be related to the query popularity of each of one or more fields in the index that satisfies the query condition. For example, the satisfaction degree of the query condition may be a sum of the query popularities of the fields in the index that satisfy the query condition, etc. Taking an example that the query condition corresponding to the index P includes querying for a user ID with an address of address 1, and the query condition corresponding to the index Q includes querying for a user ID with a name of name 1, the satisfaction degree of the query condition may be the sum of the query popularities of all fields with the address of address 1, and the satisfaction degree of the query condition corresponding to index Q may be the sum of the query popularities of all fields with the name of name 1.

The query type refers to a type of the query task of the user. The query type may be determined based on the query condition. The query type may include an intersection query or a union query.

The intersection query means that a final query result of the user is an intersection of query results in the plurality of indexes. For example, if the query condition of the user is to query for a user ID whose address is address 1 and whose name is name 1, user IDs whose addresses are address 1 may be quired in the index P, user IDs whose names are name 1 may be quired in the index Q, and the intersection may be taken from the query results of the index P and the index Q. The query type of the query task may be the intersection query. That is, the final query result may be the intersection of the query results respectively in the index P and the index Q.

The union query means that the final query result of the user is a union of query results in the plurality of indexes. For example, if the query task of the user is to query for a user ID whose address is address 1 or whose name is name 1, user IDs whose addresses are address 1 may be quired in the index P, user IDs whose names are name 1 may be quired in the index Q, and the union may be taken from the query results of the index P and the index Q. The query type of the query task may be the union query. That is, the final query result may be the union of the query results respectively in the index P and the index Q.

The query order of the plurality of indexes in the index group may be determined based on the satisfaction degree of the query condition and the query type.

For example, the query order of the intersection query may be that a priority level of performing the query on an index with a greater satisfaction degree of the query condition is higher than a priority level of the query performing on an index with a lower satisfaction degree; and the query order of the union query may be that a priority level of performing the query on an index with smaller satisfaction degree of the query condition is higher than a priority level of the query performing on an index with a greater satisfaction degree. In other words, in the intersection query, the query on an index with a greater satisfaction degree of the query condition may be performed preferentially; and in the union query, the query on an index with smaller satisfaction degree of the query condition may be performed preferentially.

It is understood that the satisfaction degree of the query condition may reflect an amount of data in the index that satisfies the query condition to a certain extent. For example, an index with a greater satisfaction degree of the query condition may indicate that the user queries more frequently in the index. The data in the index may better meet a query requirement of the user, that is, the amount of data in the index that meet the query condition may be larger. In the intersection query, the processor may preferentially perform the query on indexes with a large amount of data satisfying the query condition, and perform the query on other indexes based on the queried result, which may reduce the count of queries and improve the query efficiency. Similarly, in the union query, the processor may preferentially perform the query on indexes with a small amount of data satisfying the query condition, which may also reduce the count of queries and improve the query efficiency.

In some embodiments of the present disclosure, the processor may determine the query order based on the satisfaction degree of the query condition and the query type, which may reduce the count of queries and improve the query efficiency.

In 250, in response to receiving the association query request, a query result may be determined based on the plurality of shards.

For example, the processor may sequentially query across the plurality of indexes in the index group based on the query order and determine the query result.

The query result may be a result corresponding to the query task of the user. For example, when the query task of the user is to query for a name of a user of a certain address, the query result may be the name of the user corresponding to the address, etc.

In some embodiments, the processor may first perform the query on the index P based on the initial query condition of the index P and perform the query on the index Q based on the query result of the index P and the initial query condition of the index Q. Taking the example of the index group including index P and index Q, the query order may be to query the index P first and query the index Q. The processor may perform the query for a user ID of a certain address in index P, perform the query for a user name corresponding to the user ID in index Q, and determine the user name as the query result.

In some embodiments, the processor may perform an association query based on a sharded query to determine the query result. More descriptions regarding the sharded query may be found elsewhere in the present disclosure, e.g., in FIG. 3.

In the process for querying sharded NoSQL data disclosed in some embodiments of the present disclosure, the index may be divided into the shards based on the routing values, and merely data in a certain shard may need to be queried each time, and there may be no need to query the data in the whole index, which may reduce the amount of data queried and improve the query efficiency. In addition, by means of dividing the index into the shards, merely the data within a shard may need to be queried in a single query, and there may be no need to query the data in the entire index, which may further improve the query efficiency.

It should be noted that the above descriptions of the process 200 is merely provided for the purpose of illustration, and not intended to limit the scope of application of the present disclosure. For those skilled in the art, multiple variations and modifications may be made to process 200 under the guidance of the present disclosure. However, these variations and modifications do not depart from the scope of the present disclosure.

Figure 3:
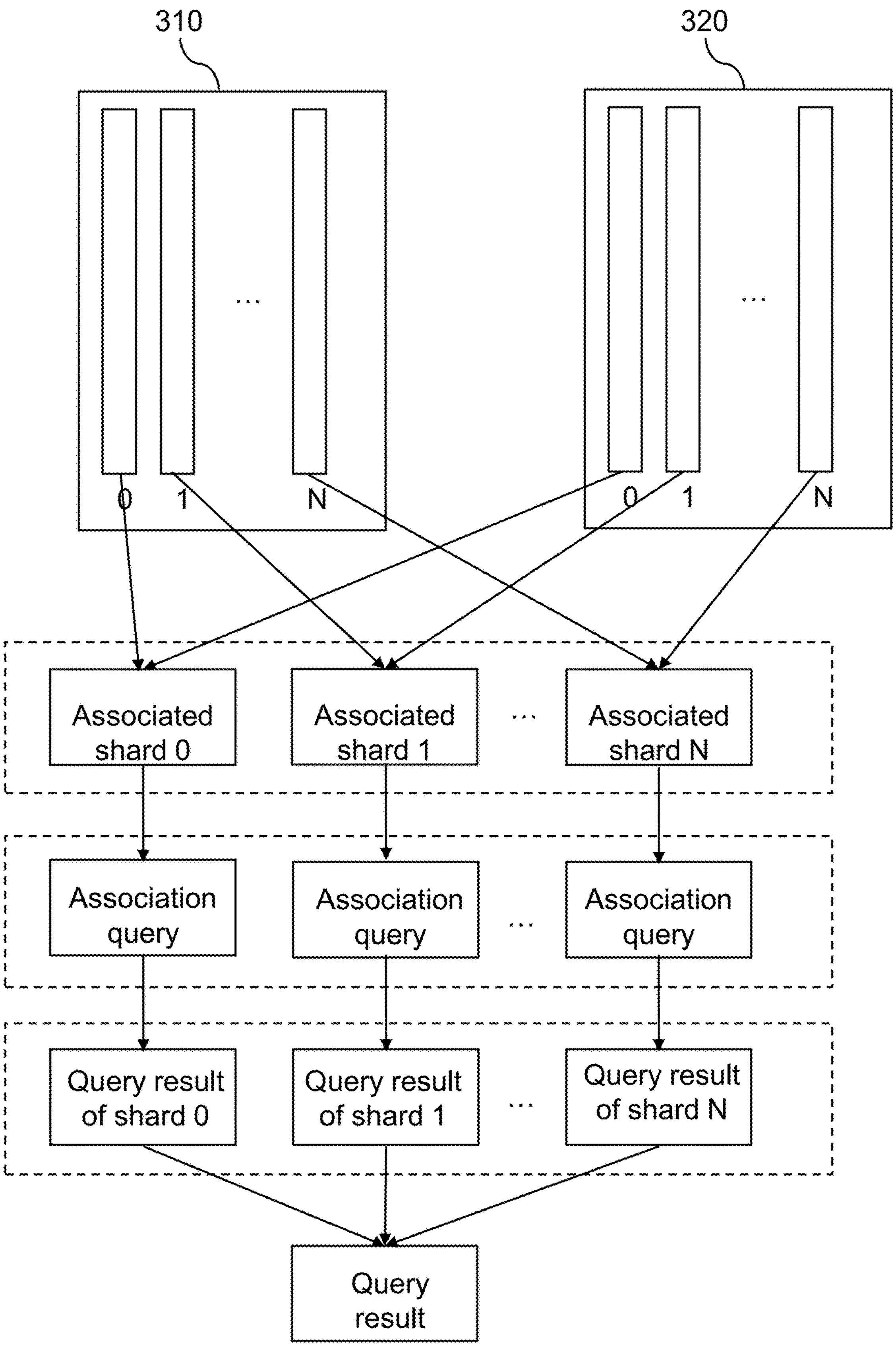
FIG. 3 is a schematic diagram illustrating an exemplary sharded query according to some embodiments of the present disclosure.

FIG. 3 is a schematic diagram illustrating an exemplary sharded query according to some embodiments of the present disclosure.

In some embodiments, the processor may obtain a sharded query result by performing a sharded query on each of the plurality of indexes in the index group; and determining the query result by merging sharded query results corresponding to the plurality of indexes. The sharded query performed on the plurality of shards may include a parallel processing, that is, the query may be simultaneously performed on different shards within an index.

The sharded query corresponding to an index refers to a query performed on the index based on the plurality of shards of the index.

Taking 2 indexes as an example, a process of the sharded query may be illustrated below in conjunction with FIG. 3. As shown in FIG. 3, there may be N shards (i.e., a plurality of shards with shard numbers 0 to N) in an index 310 and an index 320, respectively. There may be an association relationship between data in the shards of index 310 and index 320 with the same shard number. More descriptions regarding the shards may be found elsewhere in the present disclosure, e.g., FIG. 2.

The processor may determine the shards with the same shard number in the index 310 and the index 320 as associated shards. The associated shards refer to shards that have an association relationship, and the shards with the same shard number may be the associated shards. As in FIG. 3, the processor may determine an association shard 0 based on a shard 0 of the index 310 and a shard 0 of the index 320, determine an association shard 1 based on a shard 1 of the index 310 and a shard 1 of the index 320, and determine an associated shard N based on a shard N of the index 310 and a shard N of the index 320, etc.

The processor may obtain sharded query results corresponding to a plurality of associated shards by performing an association query on the plurality of associated shards. For example, the processor may obtain a sharded query result corresponding to the shard 0 by performing the association query on the associated shard 0; the processor may obtain a sharded query result corresponding to the shard 1 by performing the association query on the associated shard 1; and the processor may obtain a sharded query result corresponding to the shard N by performing the association query on the associated shard N, etc.

Further, the processor may determine the query result based on the sharded query results of the plurality of shards. For example, the processor may determine the query result by merging the sharded query results of the plurality of shards. As shown in FIG. 3, the processor may determine the query result by merging the sharded query result of the shard 0, the sharded query result of the shard 1, and the sharded query result of the shard N. The merging refers to merging the sharded query results of the plurality of shards into the single query result. For example, the merging may be to take a union of the sharded query results of the plurality of shards as the query result. As another example, the merging may be to take an intersection of the query results of the plurality of shards.

In some embodiments, the sharded queries may be performed in parallel. For example, queries of the shards 0 to N may be performed simultaneously.

In some embodiments, the processor may obtain an index query result by performing the query on shards of each of a plurality of indexes in the index group and determine the query result based on the index query result corresponding to each index.

Merely by way of example, for the index 310 and the index 320, the processor may perform the sharded query based on initial query conditions of the index 310 and the index 320, respectively, obtain the index query result corresponding to the index 310 and the index query result corresponding to the index 320, and determine the query result based on a query type, the index query result corresponding to the index 310, and the index query result corresponding to the index 320. For example, for an intersection query, the processor may determine an intersection of the index query result corresponding to the index 310 and the index query result corresponding to the index 320 as the query result. As another example, for a union query, the processor may determine a union of the index query result corresponding to the index 310 and the index query result corresponding to the index 320 as the query result. More descriptions regarding the query type may be found in FIG. 2.

Understandably, the processor may reduce a wait time of the query and increase the speed and efficiency of the query through parallel processing.

Figure 4:
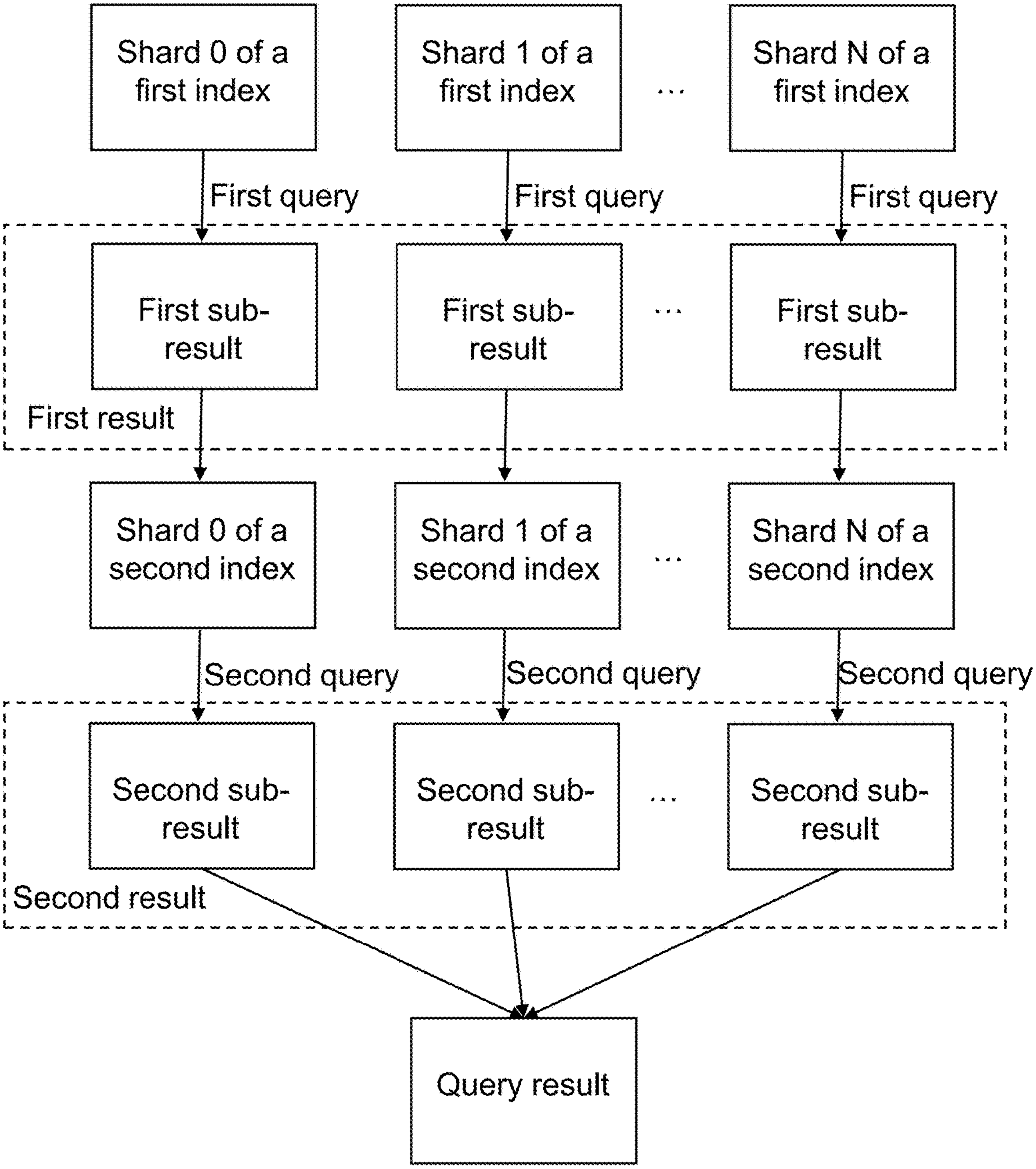
FIG. 4 is a schematic diagram illustrating an exemplary process for determining a query result according to other embodiments of the present disclosure.

FIG. 4 is an exemplary schematic diagram illustrating determining a query result according to other embodiments of the present disclosure.

In some embodiments, the processor may determine a first result by performing a first query based on a first index in the index group, determine a second result by performing a second query based on the first result and a second index, and determine the query result based on the second result.

The first index refers to an index on which the query is performed first in the index group. The first query refers to a query performed on the first index, and a result obtained by the first query may be the first result. As shown in FIG. 4, the first query performed on the first index may be sharded. For example, the processor may obtain the first result by performing the first query on a plurality of shards (e.g., shards 0~N) of the first index based on an initial query condition corresponding to the first index. The first result may include a plurality of first sub-results. The first sub-results may correspond to sharded query results of the plurality of shards in the first index, respectively.

The processor may determine the second result by performing the second query based on the first result and the second index. The second index refers to an index on which the second query following the first query in time sequence is performed in the index group. The second query refers to a query following the first query, and a result obtained by the second query may be the second result. As shown in FIG. 4, the second query performed on the second index may be sharded. The processor may determine a current query condition of the second index based on the first result and an initial query condition corresponding to the second index, and obtain the second result by performing the second query on a plurality of shards (e.g., shards 0~N) of the second index based on the current query condition of the second index. The second result may include a plurality of second sub-results. The second sub-results may correspond to sharded query results of the plurality of shards in the second index, respectively.

The processor may determine the query result based on the second result. For example, the processor may designate the second result as the query result. The processor may determine the second query result by merging the plurality of second sub-results.

In some embodiments, the index group may include at least three indexes. The processor may perform the sharded query on each index in the index group based on a query order to obtain a sharded query result corresponding to each of the at least three indexes, and determine the query result based on the sharded query results corresponding to the at least three indexes.

Exemplarily, when there are three indexes in the index group, the processor may determine a current query condition of a third index based on the determined second result and an initial query condition corresponding to the third index (i.e., a third index on which the third query following the second query is performed in the index group), and the plurality of sharded query results may be obtained by performing the sharded query on a plurality of shards (e.g., shards 0~N) of the third index based on the current query condition of the third index. Further, the processor may determine the query result by merging the plurality of sharded query results obtained by performing the sharded query on the third index.

When there are more (e.g., 4, 5, etc.) indexes in the index group, the processor may determine the corresponding query result in a similar way, which is not be repeated herein.

In some embodiments, the processor may obtain a plurality of first scrolling results by performing the first query on the first index in a scrolling manner, obtain at least one second scrolling result by performing the second query in a scrolling manner based on at least one of the first scrolling results and the second index, and in response to a determination that the at least one second scrolling result satisfies a first predetermined condition, terminate the second query.

When the query (e.g., the first query and/or the second query) is performed in the scrolling manner, merely a portion of data in the index (e.g., the first index and/or the second index) each time may be queried, and there may be no need to query all the data in the index (e.g., the first index and/or the second index). The amount of data per scrolling query may be preset according to actual needs, which is not limited herein. It is understandable that by performing the scrolling query, the amount of data quired may be large enough and too much data per query may be avoided, thereby improving the query efficiency and query speed.

The performing the first query in a scrolling manner refers to performing a query on merely a portion of data in the first index during the first query. The portion of data may include data in a portion of shards of the plurality of shards, etc. The first query may be performed in the scrolling manner for a plurality of times. A result obtained by performing the first query in the scrolling manner each time may be used as a first scrolling result.

The second query refers to a query that is performed on the second index in the scrolling manner. For example, the second query may be an association query performed on a portion of data in the second index based on at least one first scrolling result and the initial query condition corresponding to the second index. The second query may be performed for a plurality of times, and a result obtained by performing the second query each time may be used as the second scrolling result.

Figure 5:
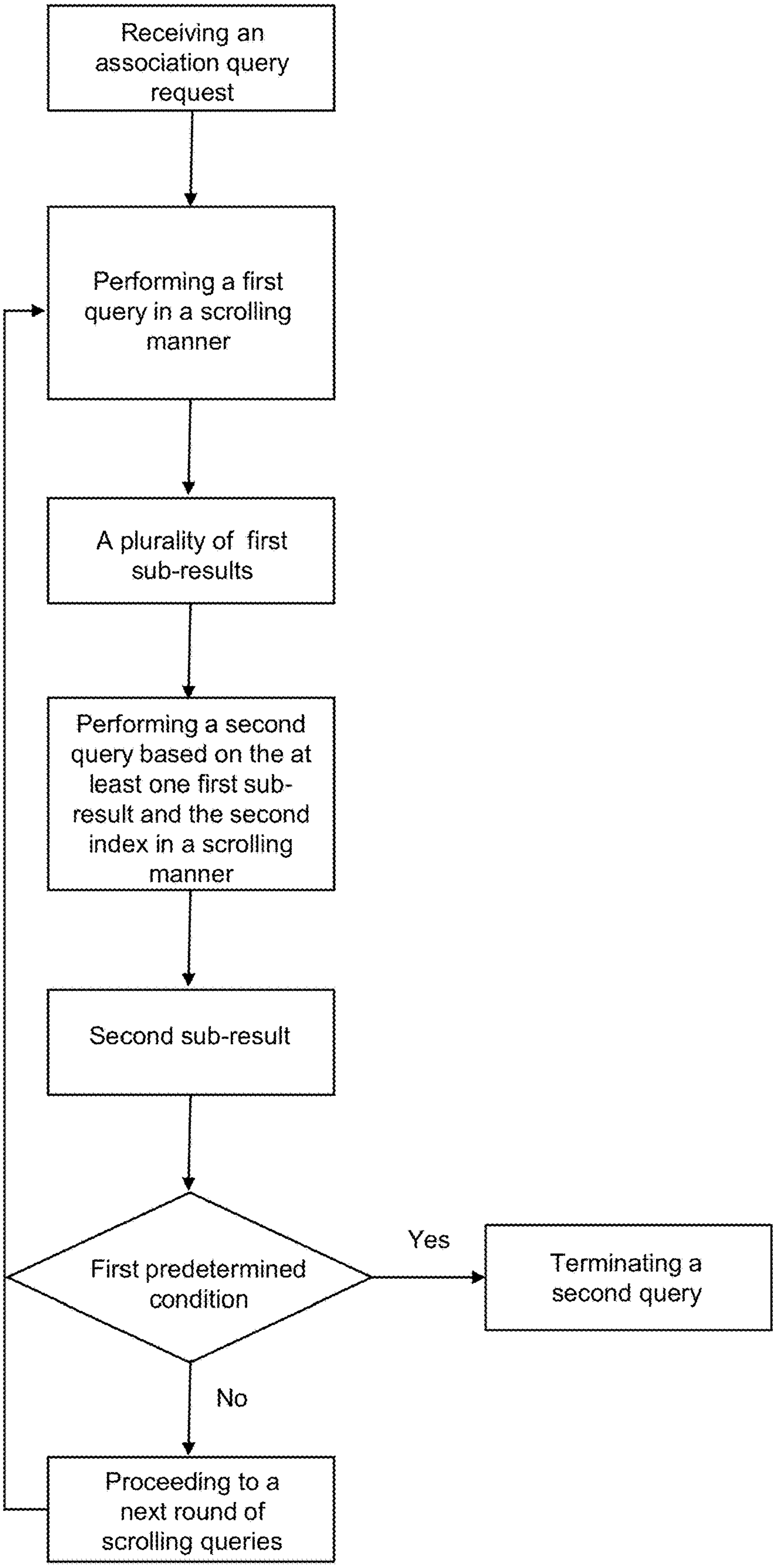
FIG. 5 is an exemplary schematic diagram illustrating an exemplary process for performing a query in a scrolling manner according to some embodiments of the present disclosure.

FIG. 5 is an exemplary schematic diagram illustrating performing a query in a scrolling manner according to some embodiments of the present disclosure. As shown in FIG. 5, the processor may receive an association query request sent by a user, and obtain a plurality of first scrolling results by performing a first query in a scrolling manner based on an initial query condition.

The processor may also obtain at least one second scrolling result by performing a second query in a scrolling manner based on at least one of the first scrolling results and a second index.

The processor may determine whether the at least one second scrolling result satisfies a first predetermined condition. There may be a plurality of first predetermined conditions. For example, a first predetermined condition may include at least one piece of data satisfying a query condition of the user. As another example, a first predetermined condition may include the amount of query data reaching a preset threshold. Taking the query condition input by the user that includes querying for a user name with an address of address 1 as an example, the first predetermined condition may be at least one piece of data in a first second scrolling result being matched with the at least one user name with the address of address 1.

The process of performing the query in the scrolling manner may be illustrated for the first index and the second index. The scrolling manner may include performing a plurality of rounds of queries. In each round of plurality of rounds of queries, the first query performed on the first query and the second query on the second index may be performed. For example, the processor may obtain the first scrolling result by performing the first query (e.g., performing the query on 10,000 pieces of data in the first index) on the first index based on the initial query condition corresponding to the first index. The processor may also obtain the second scrolling result by performing the second query (e.g., performing the query on 10,000 pieces of data in the second index) on the second index based on the initial query condition corresponding to the second index and the first scrolling result obtained by the round of scrolling query. In response to a determination that the second scrolling result satisfies the first predetermined condition, the processor may terminate the first query, and send the second scrolling result obtained by the scrolling query to a coordinating node. More descriptions may be found in FIG. 6. In response to a determination that the second scrolling result does not satisfy the first predetermined condition, the processor may proceed to a next round of scrolling queries, that is, the first query and the second query may be performed again until the second scrolling result satisfies the first predetermined condition.

In some embodiments, when the first query is completed and data that satisfies the initial query condition is not found, the processor may terminate the association query and report a null result, informing that no corresponding result is queried, etc.

In some embodiments, the first query and the second query may be performed by a query node, and the sharded query further may include: in response to a determination that the first query is terminated, sending, by the query node, the at least one second scrolling result to the coordination node; aggregating, by the coordination node, the at least one second scrolling result to form an aggregated result; and in response to a determination that the aggregated result satisfies a second predetermined condition, informing the query node to terminate the first query.

Figure 6:
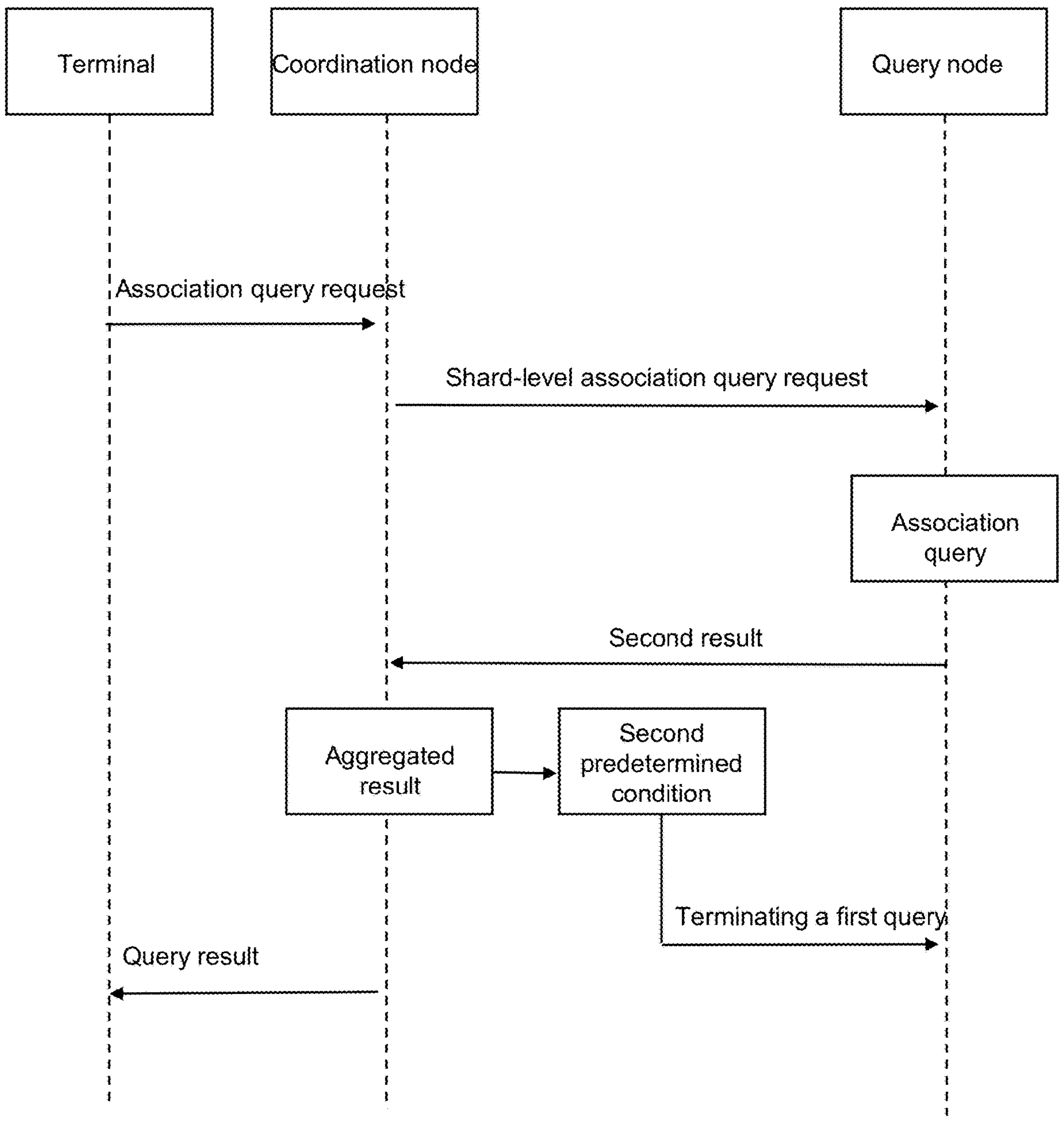
FIG. 6 is a schematic diagram illustrating an exemplary process for determining a query result according to other embodiments of the present disclosure.

FIG. 6 is a schematic diagram illustrating determining a query result according to other embodiments of the present disclosure. As shown in FIG. 6, a user may send an association query request to a coordination node via a terminal, and after receiving the association query request, the coordination node may obtain a shard-level association query request by parsing the association query request.

The shard-level association query request refers to an association query request corresponding to each shard in an index. For example, the association query request corresponding to each shard may include a query condition, a query order, etc., of each shard.

In some embodiments, referring to FIG. 5, in response to a determination that the first query is terminated, the query node may send at least one second scrolling result to the coordination node. The coordination node may aggregate the at least one second scrolling result to form an aggregated result. The aggregated result refers to a result of the query when the query in the scrolling manner ends.

In some embodiments, when the query in the scrolling manner ends after only one round is executed, the coordination node may determine the obtained second scrolling result as the aggregated result. When the query in the scrolling manner ends after a plurality of rounds are executed, the query node may send the second scrolling result obtained in each round to the coordination node, and the coordination node may obtain a merged result by merging the second scrolling results of all rounds and determine the merged result as the aggregated result.

In some embodiments, in response to a determination that the aggregation result satisfies a second predetermined condition, the coordination node may inform the query node to terminate the first query, and accordingly, the association query may end. In response to a determination that the aggregation result does not satisfy the second predetermined condition, the coordination node may inform the query node to continue with a next round of scrolling query. The second predetermined condition may include that data in the aggregation result satisfies a query condition of the user. Taking the query task input by the user that includes query for a user name with an address of address 1 and address 2 as an example, the second predetermined condition may be that data in the aggregation result satisfies (e.g., matches, be the same as, etc.) the user name with the address of address 1 and address 2. In some embodiments, the second predetermined condition may include that all the data in the database has been queried, the amount of query data meets a preset threshold, etc., which is not limited herein.

Further, the coordination node may determine the aggregated result that satisfies the second predetermined condition as the query result and send the query result to the terminal. More descriptions regarding the terminal may be found in FIG. 1 and the relevant associated descriptions thereof.

Figure 7:
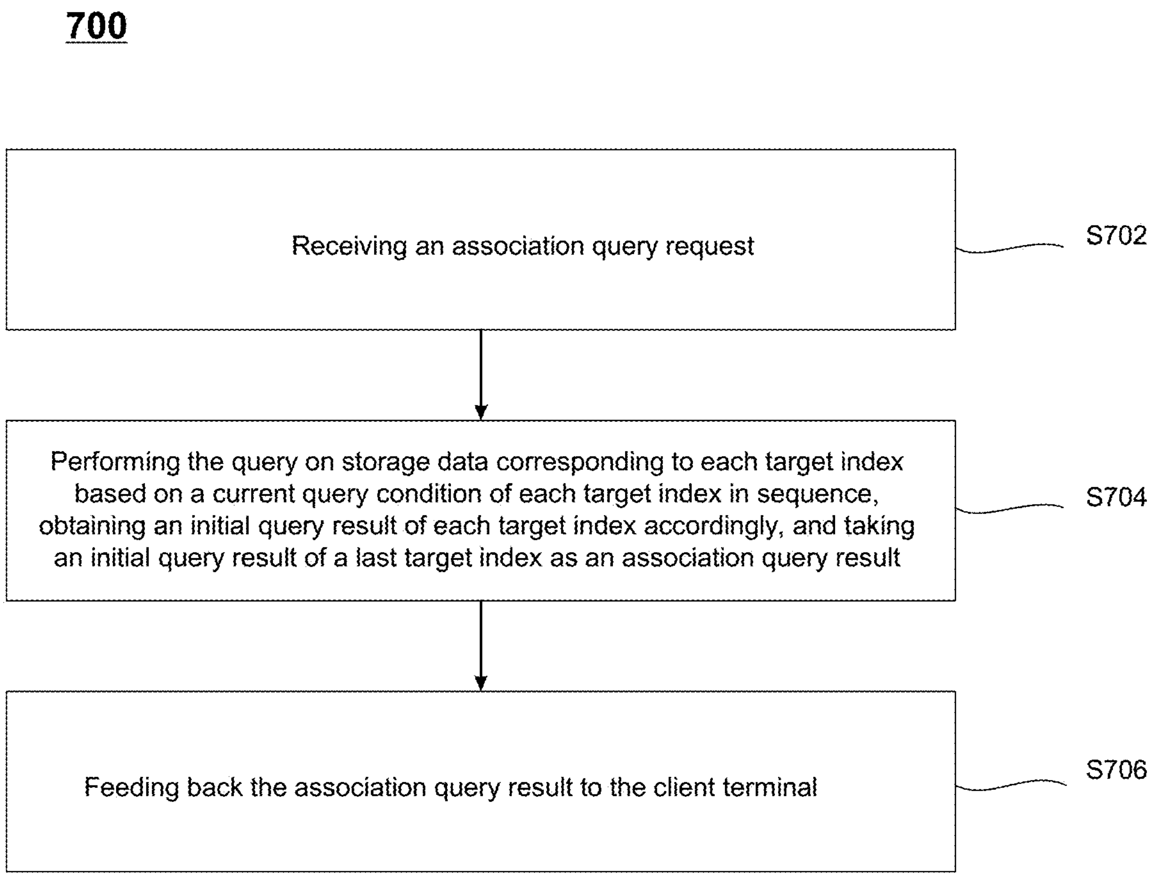
FIG. 7 is a flowchart illustrating an exemplary process for data query according to some embodiments of the present disclosure.

FIG. 7 is a flowchart illustrating an exemplary process for querying data according to some embodiments of the present disclosure. Specifically, the process may include the following operations.

In S702, an association query request may be received from a client terminal. The association query request may be used to request a data query for at least two target indexes and may include an initial query condition of each target index.

In some embodiments of the present disclosure, the process for querying data in embodiments of the present disclosure may be performed by a search engine, such as a distributed search engine (Elasticsearch), or other search engines, which are not limited herein. It is understood that when the search engine described herein is used as the execution body, an actual hardware execution entity may be one or more node devices involved in operation of the search engine.

In some embodiments, the association query request may include index information of the at least two target indexes. After the search engine receives the association query request sent by the client terminal, the search engine may determine the target indexes that need to be queried based on the index information of the at least two target indexes. The at least two target indexes means that there may be two target indexes, three target indexes, or more than three target indexes. In this embodiment, the at least two target indexes may be at least two indexes having an associated field.

In this document, the associated field means that there is a same field name in the at least two indexes. For example, taking a user ID as an example, if the user ID is stored in both an index A and an index B, the user ID may be referred to as the associated field of the index A and the index B. The associated field also means that there is a same field value in the at least two indexes. For example, taking a user ID as an example, if a user ID value 101 of a certain user is stored in both the index A and the index B, the user ID value 101 may be referred to as the associated field. If there are a plurality of indexes, and when the association query is performed on the plurality of indexes, the associated field may exist in the plurality of indexes.

In other possible embodiments, the search engine may determine the target indexes after receiving the association query request from the client terminal. For example, the search engine may determine all indexes in an index group as the target indexes for data query, and perform the data query on all the indexes after receiving the association query request. As another example, the search engine may determine some of all the indexes target indexes for data querying, and perform the data query on the target indexes after receiving the association query request. As yet another example, the search engine may determine the at least two target indexes based on other information (e.g., a query condition) contained in the association query request sent by the client terminal.

In S704, the query may be performed on storage data corresponding to each target index based on a current query condition of each target index in sequence, accordingly, an initial query result of each target index may be obtained, and an initial query result of a last target index may be taken as an association query result. A current query condition of a first target index may be the initial query condition of the target index, and a current query condition of a non-first target index may be obtained based on the initial query condition of the target index and an initial query result of a previous target index.

In embodiments of the present disclosure, the performing the query on the storage data corresponding to each target index in sequence may be performing the query on the at least two target indexes one by one, and when the query of the storage data of one target index is completed, the storage data of a next target index may continue to be stored. Specifically, the query order of each target index may be performing the query on the storage data of each target index according to a query order of each target index carried in the association query request; or may be performing the query on the storage data of each target index according to a query order of a number of each target index. For example, if there are three target indexes including an index A, an index B, and an index C, the query may be performed on the index A first and on the index C last, or the query may be performed on the index C first and on the index A last. In some embodiments, the query order of each target index may be according to a predetermined query priority (also referred to as a priority) of each target index. For example, the target indexes include the index A, the index B, and the index C, if the index B has a highest query priority among the three target indexes, the index C has a secondary priority, and the index A has a lowest priority, the query may be performed on the data in the index B first and may be performed on the data in the index A last. In other embodiments, other sequential querying manners may be used, which are not limited herein.

In embodiments of the present disclosure, the query may be performed on each target index in sequence. Specific operations of performing the query on each target index may be as follows. The initial query result of the target index may be obtained by performing the query on the storage data corresponding to the target index based on the current query condition of the target index. The current query condition of the target index may be determined based on the initial query condition of the target index. Specifically, a current query condition of a first target index may be the initial query condition of the target index, and a current query condition of a non-first target index may be determined based on the initial query condition of the target index and an initial query result of a previous target index. When the query performed on the last target index is completed, an initial query result of a last target index may be used as the association query result.

In the present disclosure, the first target index may be a target index that is first in the query order. The non-first target index refers to the other target indexes after the first target index in the query order, e.g., if the query is performed on the index A, the index B, and the index C in sequence, the index A may be the first target index, and the index B and the index C may be the non-first target indexes. The last target index may be a target index that is last in the query order.

In S706, the association query result may be sent to the client terminal.

For example, there may be two target indexes, i.e., the index A and the index B. After receiving the association query request, the search engine may query the index A and the index B sequentially. Specifically, since the index A is the first target index, the initial query condition of the index A may be used as the current query condition of the index A, the search engine may first perform the query on the data corresponding to the index A for the initial query condition of the index A and obtain the initial query result of the index A after the query. Since the index B is the non-first target index, the current query condition of the index B may be obtained according to the initial query result of the index A and the initial query condition of the index B, the data corresponding to the index B may be queried according to the initial query condition of the index B, and the initial query result of the index B may be obtained. Because the index B is the last target index in the query order, the initial query result of the index B may be used as the association query result, and the association query result may be sent to the client terminal.

Specifically, if there is an associated field of the user ID in the index A and the index B, i.e., there is the user ID stored in index A and index B. Age data may be also stored in index A, and the date and an ID of a product purchased by the user may be also stored in index B. To query which products were purchased by a certain user on a certain day, the initial query condition of index A may be the age. For example, if the age is known to be 45 years old, the user ID of that satisfies the age of 45 years old may be obtained from the data in index A; and the query may be performed on the data in index B by combining with the queried user ID. The initial query condition of index B may be the date, for example, Jul. 29, 2022. In order to find the data from index B that meet the query conditions of index A and index B, that is, an association query may be performed on index A and index B. The current query condition of index B may include the query result of index A and the initial query condition of index B. That is, the current query condition of index B is Jul. 29, 2022 and the user ID, so as to find the ID of the product purchased by the user on Jul. 29, 2022 in index B.

Since the search engine may perform the association query on a plurality of target indexes, there may be no need to associate the query result of the search engine using other programs, which can improve the efficiency of data query and reduce the amount of query data.

In some embodiments, the initial query result of the first target index may include data in the storage data corresponding to the first target index that satisfies the initial query condition of the first target index. The current query condition of the non-first target index may be a combination of the initial query condition of the target index and the initial query result of the previous target index. The initial query result of the non-first target index may include data in the storage data corresponding to the non-first target index that satisfies the initial query condition of the non-first target index and matches the initial query result corresponding to the previous target index.

Taking the two target indexes of index A and index B as an example, the initial query condition of index A may be the current query condition of index A, and the current query condition of index B may be the combination of the initial query result of index A obtained by performing the query on the data in index A and the initial query condition of index B. After the query is performed on the data in index B with the current query condition, the obtained query result may be the data in index B that satisfies the initial query result of index A and the initial query condition of index B. In this way, the data that satisfies all the query conditions may be obtained by performing the association query without a need to process the query result additionally, which can improve the query efficiency.

Figure 8:
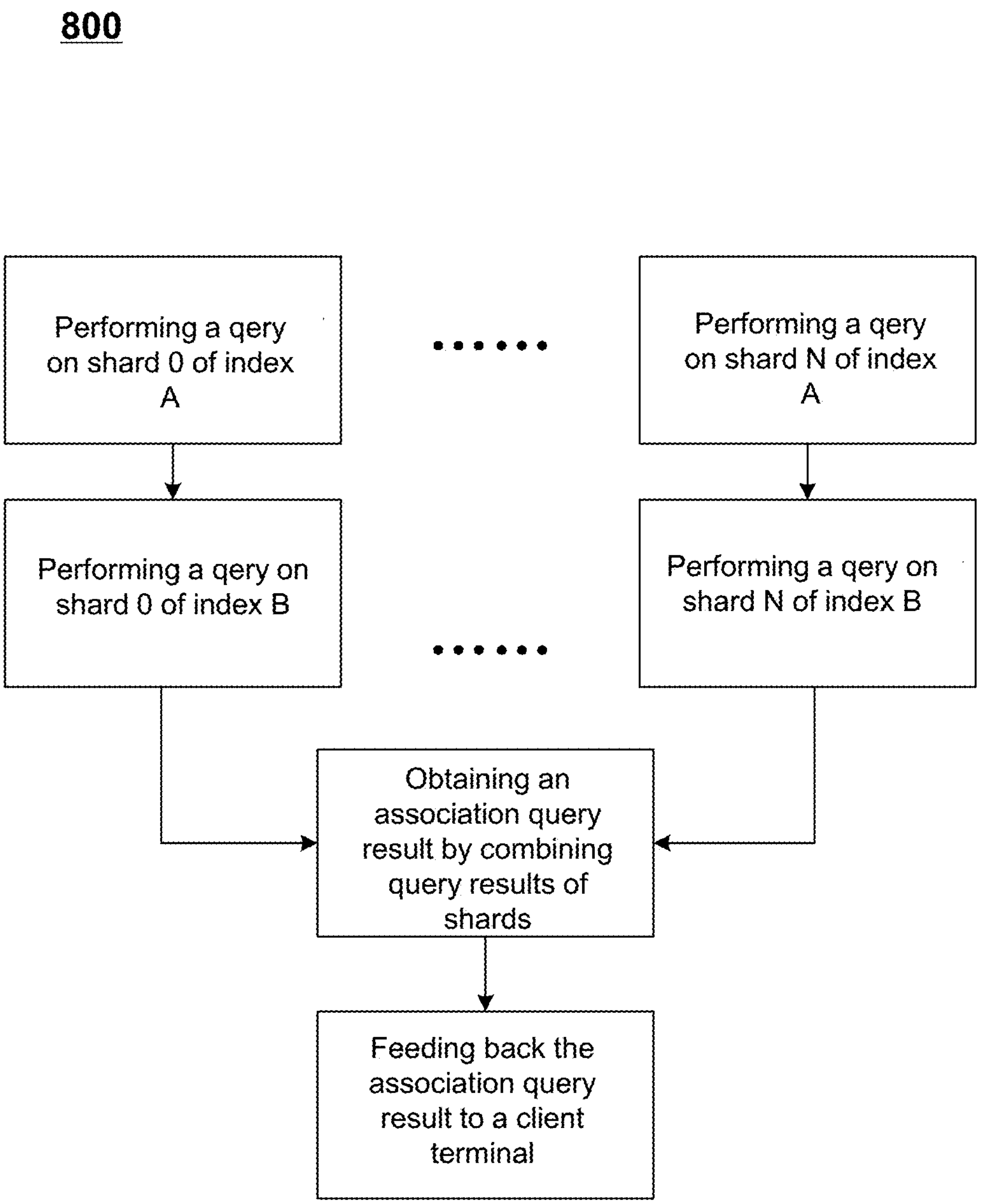
FIG. 8 is a flowchart illustrating another exemplary process for data query according to some embodiments of the present disclosure.

Referring to FIG. 8, FIG. 8 is a flowchart illustrating another exemplary process for querying data according to some embodiments of the present disclosure. Specifically, the above operation 704 may be performed according to process 800 as illustrated in FIG. 8.

In S801, one of target indexes that is not queried as an index to be queried.

One of the target indexes that is not currently queried may be selected as the index to be queried in turn according to the query order mentioned above.

In S802, an initial query result of the index to be queried may be obtained by performing a query on storage data corresponding to the index to be queried based on the current query condition of the index to be queried.

Specifically, if the index to be queried is a first target index, the current query condition of the index to be queried may be the initial query condition of the index to be queried. If the index to be queried is a non-first target index, the current query condition of the index to be queried may be obtained based on an initial query condition of the index to be queried and an initial query result of the previous target index. If the index to be queried is not the first target index, the current query condition may be obtained based on the initial query condition of the index to be queried and the initial query result of the previous target index. The storage data that satisfies the current query condition of the index to be queried may be found from the storage data corresponding to the index to be queried to obtain the initial query result of the index to be queried.

In S803, if there is storage data that satisfies the current query condition in the initial query result of the index to be queried, and the index to be queried is not the last target index, the operation that another one of the target indexes that is not currently queried is selected as the index to be queried and the subsequent operations may be performed again. In other words, the index to be queried determined in S801 may be updated using another one of the target indexes that is not currently queried.

That is, if there is the storage data that satisfies the current query condition in the initial query result of the index to be queried, and the index to be queried is not the last target index, the operation S801 may be returned to and the operations shown in FIG. 8 may be repeated.

In S804, if there is no storage data that satisfies the current query condition in the initial query result of the index to be queried, or if there is the storage data that satisfies the current query condition in the initial query result of the index to be queried and the index to be queried is the last target index, the initial query result of the index to be queried may be used as the association query result.

Specifically, still taking the two target indexes of the index A and the index B as an example, if the index A is queried first, then the index A may be used as the index to be queried first, and the initial query result of the index A may be obtained by performing the query on the data in the index A with the initial query condition of the index A as the current query condition. When the initial query condition of the index A is used to query the data in index A, if a result that meets the initial query condition is not queried in the index A, the corresponding initial query result may be null (i.e., no data is queried); if the result that meets the initial query condition is queried, there may be data that satisfies the current query condition of the index A in the initial query result of the index A. If there is data that satisfies the current query condition of the index A in the initial query result of the index A, the query is continued. The index B may be used as the index to be queried, and the initial query result of the index B may be obtained by performing the query on the data in the index B with the combination of the initial query result of the index A and the initial query condition of the index B as the current query condition of the index B. Since the index B is the last index to be queried, if there is data that satisfies the current query condition of the index B in the initial query result of the index B, the initial query result of the index B may be sent to the client terminal as the association query result. If there is no data that satisfies the current query condition of the index B in the initial query result of the index B, it is assumed that there is no data in the index B that satisfies the initial query condition of the index A and the initial query condition of the index B, the association query may end, and a null result may be output; or the client terminal may be fed back that a desired result is not queried.

In some possible embodiments, an execution body of the data query method is a distributed search engine. The storage data of the search engine may be stored in a distributed storage manner, i.e., the storage data corresponding to each target index may be stored in several shards. Accordingly, for the query operation of each target index in operation S704 or operation S802, i.e., for each target index, obtaining the initial query result of the target index by performing the query on the storage data corresponding to the target index based on the current query condition of the target index may include: obtaining a sharded query result of each shard corresponding to the target index by respectively performing the query on each shard corresponding to the target index using a sharded query condition of each shard of the target index, and obtaining the initial query result of the target index based on the sharded query result of each shard corresponding to the target index. Specifically, the initial query result of the target index may include the sharded query result of each shard corresponding to the target index, i.e., the sharded query results of the shards of the target index may be merged as the initial query result of the target index. The sharded query condition of each shard of the target index may be specifically obtained based on the initial query condition of the target index and the initial query result of the previous target index. For example, the sharded query condition of each shard of the target index may be a combination of the initial query condition of the target index and the initial query result of the previous target index.

In some specific embodiments, the query operation of each shard of the same target index may be performed in parallel in order to improve the query efficiency. That is, a parallel query may be performed on each shard corresponding to the same target index using the sharded query condition of each shard of the same target index, and the sharded query result of each shard corresponding to the same target index may be obtained.

In other specific embodiments, there may be an associated field between the at least two target indexes, and storage data corresponding to the same associated field in the storage data corresponding to the at least two target indexes may be stored on shards with a same serial number. In order to consider reducing the amount of query data, the sharded query condition of each shard may be a combination of the initial query result of the target index to which the shard belongs and the sharded query results of the shards with the same serial number in the previous target index (i.e., a previous target index of the target index to which the shard belongs). In addition, counts of shards of the target indexes described above may be the same. Additionally, routing values of the storage data corresponding to the associated field in the target index may be set to values of the associated field, so that the associated field may be stored on the shards with the same serial number in different indexes, and data association query operation may not need to be performed across shards, which can further improve the query efficiency.

Specifically, for example, the index A and the index B may be divided into three shards, the data in the index A and the index B may be stored in the three shards, and the routing values of the associated field of the index A and the index B may be set as the values of the associated field. Because the values of the associated field are the same, the routing values may also be the same, so that the associated field may be stored on the shards with the same serial number in the two indexes, e.g., if a user ID is 101, the routing value may also be 101, and the user ID and the routing value may be stored on shard 3 in two indexes.

Figure 9:
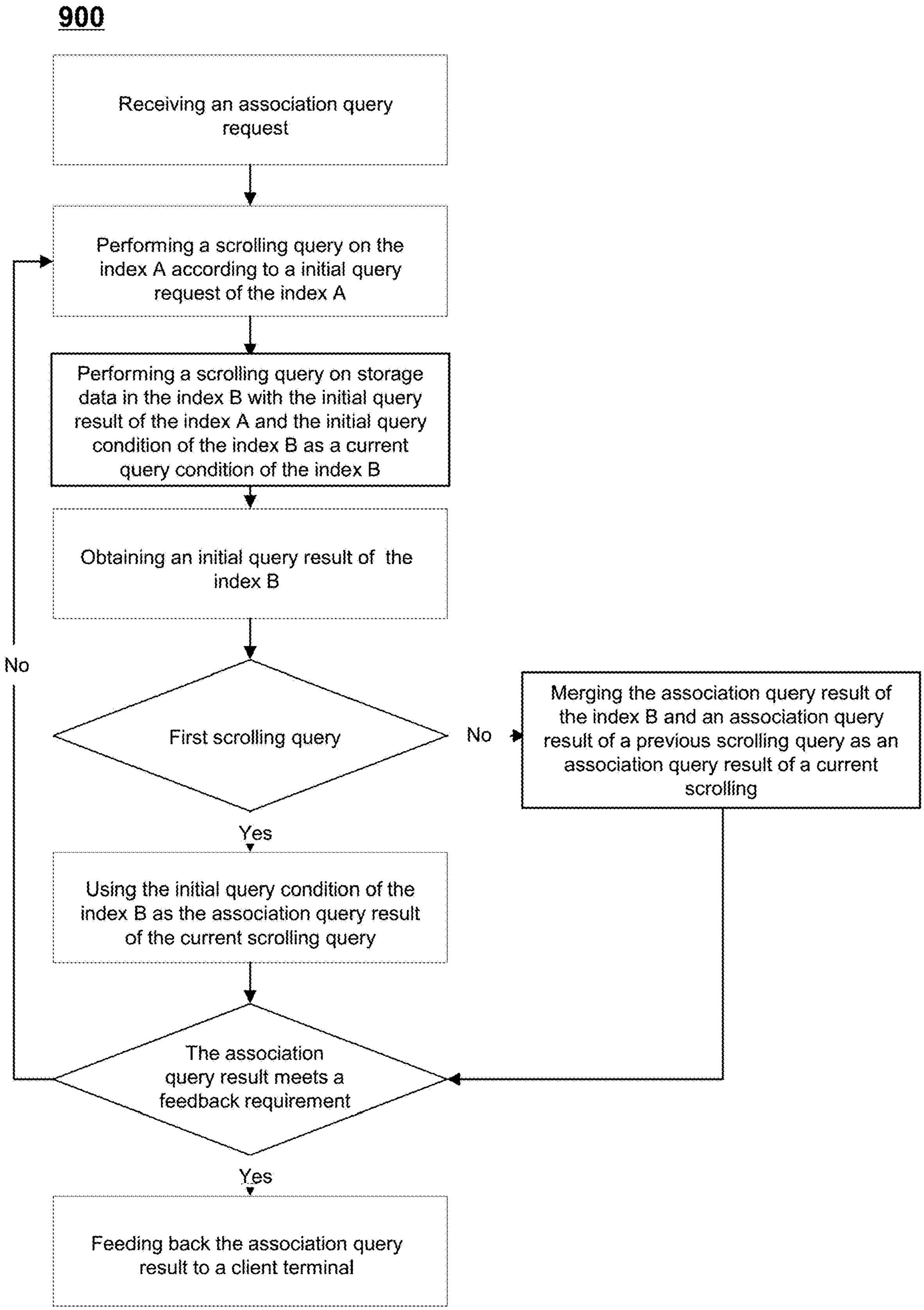
FIG. 9 is a flowchart illustrating yet another exemplary process for data query according to some embodiments of the present disclosure.

An example may be further illustrated in conjunction with FIG. 9 as follows. The index A and the index B may be divided into N+1 shards with shard serial numbers from 0 to N. After receiving an association query request, the search engine may first perform data query in parallel on each shard of the index A for an initial query request of the index A and obtain a sharded query result corresponding to each shard of the index A. When querying the index B, the search engine may also need to perform the query in parallel on each shard of the index B for the current query conditions of the index B and obtain sharded query results of the index B. The current query condition of each shard of the index B may be the combination of the sharded query result of the shard with the same serial number of the index A and the initial query condition of the index B. For example, the current query condition of shard 1 of the index B may be the combination of the sharded query result of shard 1 of the index A and the initial query condition of the index B. After the sharded query results of the index B are obtained, the sharded query result of each shard of the index B may be merged to obtain the initial query result of the index B. The initial query result of the index B may be fed back to the client terminal as the association query result.

In the embodiment, the data of the target index may be stored separately in a plurality of different shards, which may reduce the pressure of data query and storage. In addition, the query may be performed in parallel on each shard, which can improve the querying efficiency.

In some possible embodiments, the query on the at least two target indexes may be performed in a scrolling manner; that is, in the embodiment, the above operation S704 may be performed in multiple times in a scrolling manner, and performing the above operation S704 each time (i.e., performing the query on each target index) may include querying a portion of the storage data of each target index and to obtain a scrolling association query result each time the above operation S704 is performed. After one scrolling association query result is obtained by performing the query in a scrolling manner each time, the method of the embodiment may further include: in response to a determination that a current scrolling query is a non-first-time scrolling query, merging the association query result of the current scrolling query with the association query result of a previous scrolling query, and updating the merged result as the association query result of the current scrolling query. The above operation S804 may include: in response to a determination that the association query result of the current scrolling query meets a query condition, feedbacking the association query result of the current scrolling query to the client terminal.

It is understood that if the storage data of the target index is stored in a plurality of shards, each time the above operation S704 is performed to query in a portion of shards of the target index or query a portion of the storage data from each shard of the target index, respectively. The feedback requirement may be set according to a user requirement, for example, the feedback requirement may be that the storage data of each target index is queried, or the amount of data in the association query result of the current scrolling query reaches an amount of data that needs to be fed back, etc. In a specific application scenario, the association query request may include the amount of data that needs to be fed back, and the feedback requirement may be that the amount of data in the association query result of the current scrolling query reaches the amount of data that needs to be fed back.

Figure 10:
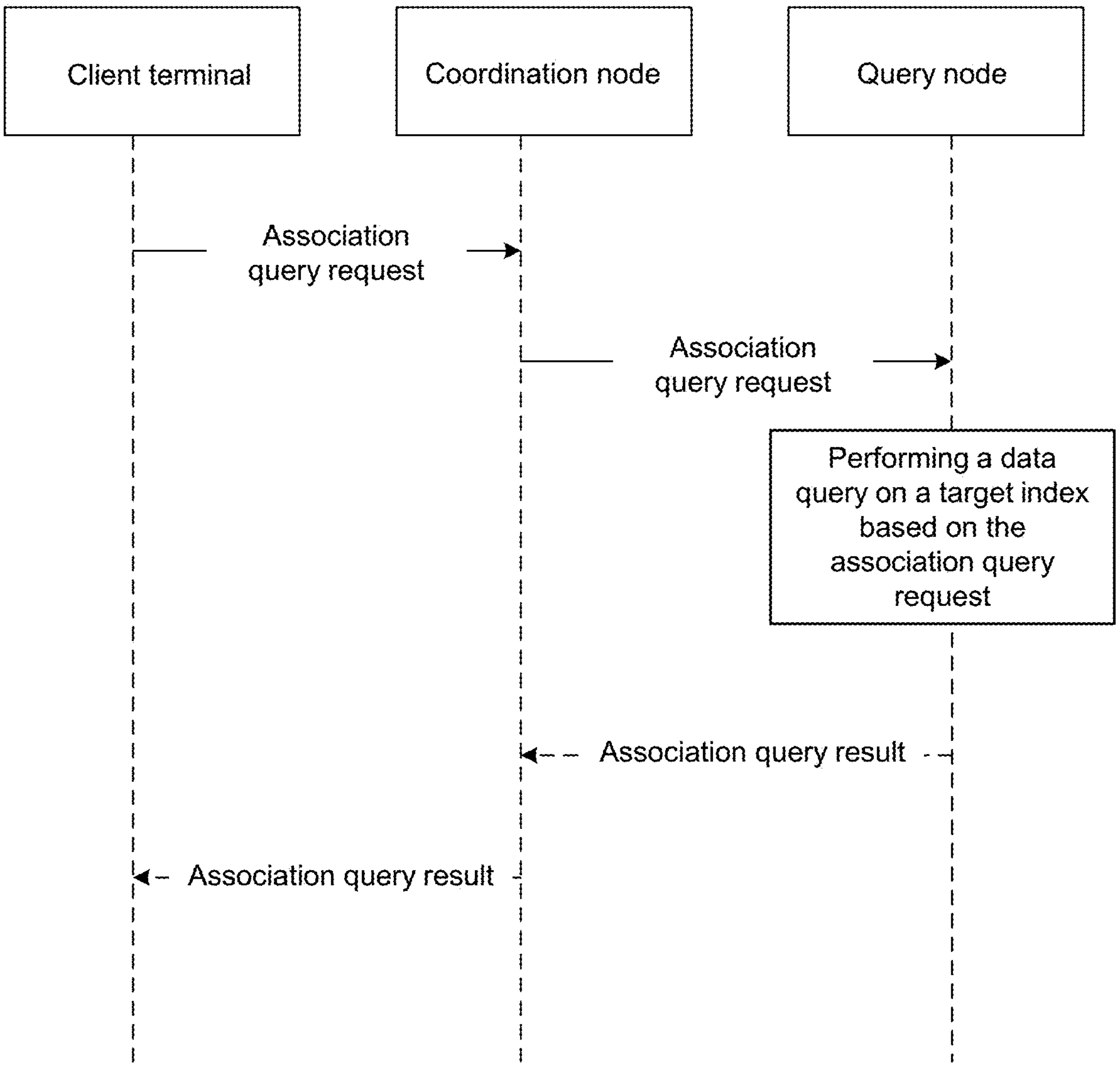
FIG. 10 is a schematic diagram illustrating an exemplary interaction in a data query system according to some embodiments of the present disclosure.

Please continue to refer to FIG. 10, after receiving the association query request, the search engine may perform the scrolling query on data in the index A according to the initial query request of the index A. In each scrolling query, 10,000 pieces of data in the target index may be queried, or the amount of data queried by each scrolling query may be set according to an actual setting, which is not limited herein. The initial query result of the index A may be obtained after the query operation is performed on the 10,000 pieces of data in the index A, and a scrolling query may be performed on the 10,000 pieces of data of the index B with the initial query result of the index A and the initial query condition of the index B as the current query condition of the index B, and the initial query condition of the index B may be obtained after the query is completed. The initial query condition of the index B may be used as the association query result of the current scrolling query, and whether the association query result obtained from the current scrolling query meets the feedback requirement may be obtained. If the association query result does not meet the feedback requirement, the above operation of "the query may be performed on storage data corresponding to each target index based on a current query condition of each target index in sequence, and accordingly, an initial query result of each target index may be obtained, and an initial query result of a last target index may be taken as an association query result" may be executed again. That is, the association query result of the second scrolling query may be obtained by querying next 10,000 pieces of data, and the association query result of the second scrolling query and the association query result obtained from the first scrolling query may be merged as the association query result of the second scrolling query. If the merged association query result meets the feedback requirement, the merged query result may be fed back to the client terminal. If the merged query result still does not meet the feedback requirement, continue to execute the next scrolling query. If the combined query results still do not meet the feedback requirements, a next scrolling query may be continued for execution until the association query result that meets the feedback requirement is obtained.

The query may be performed in the scrolling manner, which may make the total amount of data quired large enough and avoid too much data per query, thereby improving the performance of the data query.

It may be understood by those skilled in the art that, in the above method of the specific embodiment, the order in which the operations are written does not imply any limitation of the implementation process by implying a strict order of execution, and that the specific order in which the operations are to be performed may be determined in terms of the function and possible intrinsic logic.

Figure 11:
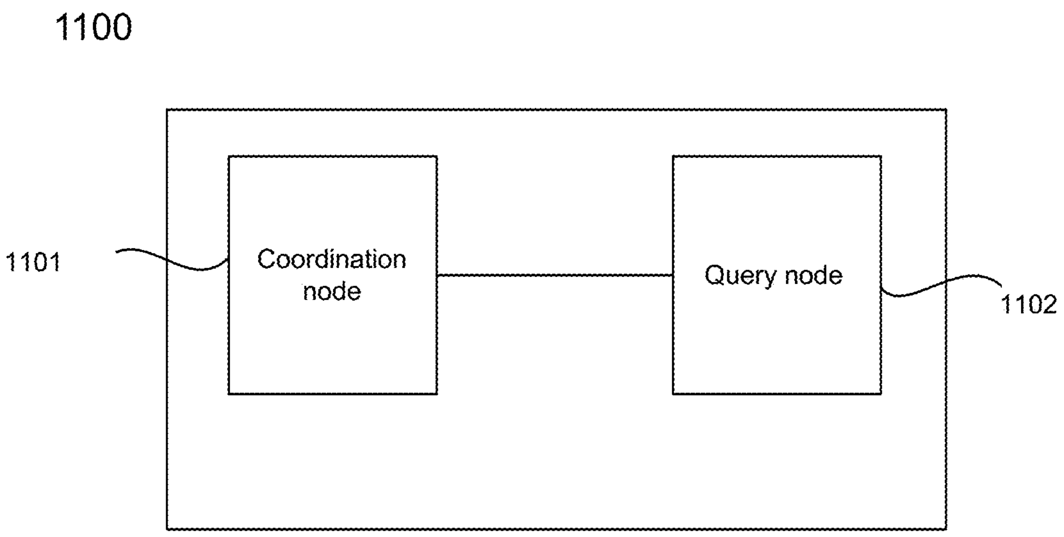
FIG. 11 is a schematic diagram illustrating an exemplary data query system according to some embodiments of the present disclosure.

Referring to FIG. 10 and FIG. 11, FIG. 10 is a schematic diagram illustrating an exemplary interaction of a data query system according to some embodiments of the present disclosure, and FIG. 11 is a schematic diagram illustrating an exemplary structure of a data query system according to some embodiments of the present disclosure. The data query system 1100 may include a coordination node 1101 and a plurality of data nodes 1102. It is understood that the plurality of data nodes 1102 may be one data node or two or more data nodes, and only one data node may be illustrated in FIG. 11 schematically. The coordination node 1101 may be used to receive an association query request from a client terminal and send the current query condition of each target index to the data node 1102 corresponding to each target index in sequence. The association query request may be used to request a data query for at least two target indexes and include an initial query condition of each target index, and the data node 1102 corresponding to the target index may store storage data corresponding to the target index.

The data node 1102 corresponding to the target index may be used to obtain the initial query result of the target index by querying the storage data corresponding to the target index based on the current query condition of the target index and in response to a determination that a target index is a target index queried last, the initial query result of the target index may be used as the association query result and may be fed back to the coordination node 1101. A current query condition of a first target index may be the initial query condition of the target index, and a current query condition of a non-first target index may be obtained based on the initial query condition of the target index and an initial query result of a previous target index.

The coordination node 1101 may be also used to feedback the association query result to the client terminal.

The coordination node 1101 and the data node 1102 may be only roles in a particular task, and an actual same node may be used as the coordination node 1101 or used as the data node 1102 in different tasks. The coordination node 1101 and the data node 1102 may be integrated into one or more units in a same device, or a plurality of different devices may be used as the data node 1102 or the coordination node 1101 to perform functions of the data node 1102 or the coordination node 1101. For the case where there are a plurality of shards in the index, the data node 1102 corresponding to the target index may be one or more.

It should be noted that the specific implementation operations of the coordination node 1101 and the data node 1102 to achieve the above functions may be found in the corresponding descriptions of the above embodiments, which is not be repeated herein.

Figure 12:
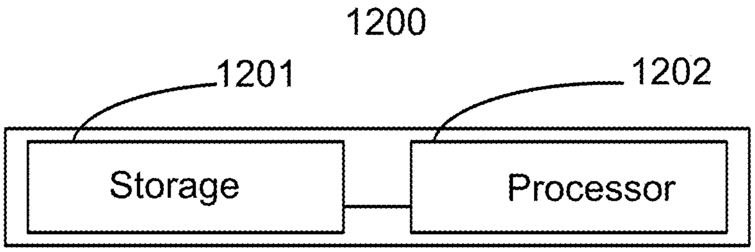
FIG. 12 is a schematic diagram illustrating an exemplary electronic device according to some embodiments of the present disclosure.

Referring to FIG. 12, FIG. 12 is a schematic diagram illustrating an exemplary structure of an electronic device according to some embodiments of the present disclosure. The electronic device 1200 may include storage 1201 and a processor 1202 coupled to each other. The processor 1202 may be configured to execute program instructions stored in the storage 1201 to implement the operation in the data query method in the embodiments. In a specific embodiment scenario, the electronic device 1200 may include, but is not limited to: a microcomputer, a server, and in addition, the electronic device 1200 may include a mobile device such as a laptop, a tablet computer, etc., which are not limited herein.

Specifically, the processor 1202 may be configured to control the processor 1202 and the storage 1201 to implement the operations of the data query method in the embodiments. The processor 1202 may also be referred to as a Central Processing Unit (CPU). The processor 1202 may be an integrated circuit chip with signal processing capabilities. The processor 1202 may also be a general-purpose processor, a Digital Signal Processor (DSP), an Application Specific Integrated Circuit (ASIC), a Field-Programmable Gate Array (FPGA), or other programmable logic device, a discrete gate or transistor logic device, or a discrete hardware component. The general-purpose processor may be a microprocessor or the processor may be any conventional processor, etc. Alternatively, the processor 1202 may be co-implemented by an integrated circuit chip.

Figure 13:
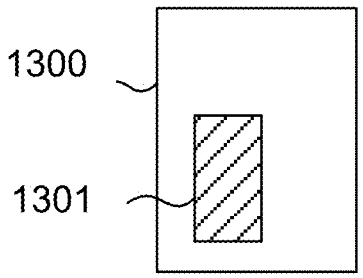
FIG. 13 is a schematic diagram illustrating an exemplary computer-readable storage medium according to some embodiments of the present disclosure.

FIG. 13 is a schematic diagram illustrating an exemplary structure of a computer-readable storage medium according to some embodiments of the present disclosure. The non-volatile computer-readable storage medium 1300 may store program instructions 13001 that are capable of being run by a processor, and the program instructions 13001 may be used to implement the operations in the above data query method in the embodiments.

In some embodiments, functions or modules contained in the device provided in the embodiments of the present disclosure may be used to perform processes (e.g., process 200, process 500, process 700, process 800, process 900, etc.) described in the embodiments, and the specific implementation thereof may be found in the descriptions of the above embodiments, which is not repeated herein.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for querying sharded NoSQL data, comprising:
- obtaining an index setting and an associated field;
- determining routing values based on the associated field;
- establishing an index group including a plurality of indexes, at least a portion of the plurality of indexes having the associated field;
- dividing each of the plurality of indexes into a plurality of shards based on the index setting and the routing values;
- obtaining an association query request based on the associated field; and
- in response to receiving the association query request, determining a query result based on the plurality of shards, wherein the determining a query result based on the index group includes:
- obtaining a sharded query result by performing a sharded query on each of the plurality of indexes in the index group; the sharded query performed on each of the plurality of shards including a parallel processing; and
- determining the query result by merging sharded query results corresponding to the plurality of indexes.

2. The method of claim 1, wherein the association query request includes the associated field, a query condition based on the index group, and a query order of an index within the index group.

3. The method of claim 2, wherein the query order is determined based on a satisfaction degree of the query condition and a query type, and the query type includes an intersection query or a union query.

4. The method of claim 1, wherein the sharded query includes:
- determining a first result by performing a first query based on a first index in the index group;
- determining a second result by performing a second query based on the first result and a second index; and
- determining the query result based on the second result.

5. The method of claim 1, wherein the sharded query further includes:
- obtaining a plurality of first scrolling results by performing a first query on a first index in a scrolling manner;
- obtaining at least one second scrolling result by performing a second query in a scrolling manner based on at least one of the first scrolling results and a second index; and
- in response to a determination that the at least one second scrolling result satisfies a first predetermined condition, terminating the second query.

6. The method of claim 5, wherein the sharded query is performed by a query node, and the sharded query further includes:
- in response to a determination that the third query is terminated, sending, by the query node, the at least one second scrolling result to a coordination node;
- aggregating, by the coordination node, the at least one second scrolling result to form an aggregated result; and
- in response to a determination that the aggregated result satisfies a second predetermined condition, informing the query node to terminate the first query.

7. The method of claim 1, wherein the index group includes at least three indexes, the sharded query includes:
- performing the sharded query on each index in the index group based on a query order; and
- determining the query result based on the sharded query result.

8. The method of claim 1, wherein the plurality of indexes includes at least three indexes and at least two different second associated fields, one of the second associated fields being same as or different from the associated field, and determining the routing values includes:
- obtaining a splicing result by splicing the associated fields based on a predetermined order;
- obtaining a mapping result by performing a mapping operation on the splicing result; and
- determining the routing values based on the mapping result.

9. An electronic device comprising a storage and a processor, wherein the processor is configured to execute program instructions stored in the storage to implement a method for querying sharded NoSQL data, comprising:
- obtaining an index setting and an associated field;
- determining routing values based on the associated field;

establishing an index group including a plurality of indexes, at least a portion of the plurality of indexes having the associated field;

dividing each of the plurality of indexes into a plurality of shards based on the index setting and the routing values;

obtaining an association query request based on the associated field; and in response to receiving the association query request, determining a query result based on the plurality of shards, wherein the determining a query result based on the index group includes:

obtaining a sharded query result by performing a sharded query on each of the plurality of indexes in the index group; the sharded query performed on each of the plurality of shards including a parallel processing; and determining the query result by merging sharded query results corresponding to the plurality of indexes.

10. The system of claim 9, wherein the association query request includes the associated field, a query condition based on the index group, and a query order of an index within the index group.

11. The system of claim 10, wherein the query order is determined based on a satisfaction degree of the query condition and a query type, and the query type includes an intersection query or a union query.

12. The system of claim 9, wherein the sharded query includes:

determining a first result by performing a first query based on a first index in the index group;

determining a second result by performing a second query based on the first result and a second index; and determining the query result based on the second result.

13. The system of claim 9, wherein the sharded query further includes:

obtaining a plurality of first scrolling results by performing a first query on a first index in a scrolling manner;

obtaining at least one second scrolling result by performing a second query in a scrolling manner based on at least one of the first scrolling results and a second index; and in response to a determination that the at least one second scrolling result satisfies a first predetermined condition, terminating the second query.

14. The system of claim 13, wherein the sharded query is performed by a query node, and the sharded query further includes:

in response to a determination that the third query is terminated, sending, by the query node, the at least one second scrolling result to a coordination node;

aggregating, by the coordination node, the at least one second scrolling result to form an aggregated result; and in response to a determination that the aggregated result satisfies a second predetermined condition, informing the query node to terminate the first query.

15. The system of claim 9, wherein the index group includes at least three indexes, the sharded query includes:

performing the sharded query on each index in the index group based on a query order; and determining the query result based on the sharded query result.

16. The system of claim 9, wherein the plurality of indexes includes at least three indexes and at least two different second associated fields, one of the second associated fields being same as or different from the associated field, and determining the routing values includes:

obtaining a splicing result by splicing the associated fields based on a predetermined order;

obtaining a mapping result by performing a mapping operation on the splicing result; and determining the routing values based on the mapping result.

17. A non-transitory computer-readable storage medium storing computer instructions, wherein when reading the computer instructions in the storage medium, a computer performs a method for querying sharded NoSQL data, comprising:

obtaining an index setting and an associated field;

determining routing values based on the associated field;

establishing an index group including a plurality of indexes, at least a portion of the plurality of indexes having the associated field;

dividing each of the plurality of indexes into a plurality of shards based on the index setting and the routing values;

obtaining an association query request based on the associated field; and in response to receiving the association query request, determining a query result based on the plurality of shards, wherein the determining a query result based on the index group includes:

obtaining a sharded query result by performing a sharded query on each of the plurality of indexes in the index group; the sharded query performed on each of the plurality of shards including a parallel processing; and determining the query result by merging sharded query results corresponding to the plurality of indexes.

18. The non-transitory computer-readable storage medium of claim 17, wherein the plurality of indexes includes at least three indexes and at least two different second associated fields, one of the second associated fields being same as or different from the associated field, and determining the routing values includes:

obtaining a splicing result by splicing the associated fields based on a predetermined order;

obtaining a mapping result by performing a mapping operation on the splicing result; and determining the routing values based on the mapping result.

* * * * *